United States Patent
Hirooka et al.

(10) Patent No.: US 9,355,327 B2
(45) Date of Patent: May 31, 2016

(54) IMAGE PROCESSING APPARATUS AND IMAGING APPARATUS WITH NOISE CORRECTION FUNCTION AND SIGNAL LEVEL CORRECTION FUNCTION

(71) Applicant: Hitachi Industry & Control Solutions, Ltd., Hitachi-shi, Ibaraki (JP)

(72) Inventors: Shinichiro Hirooka, Tokyo (JP); Hirotomo Sai, Tokyo (JP); Junji Shiokawa, Tokyo (JP); Daisuke Yoshida, Tokyo (JP)

(73) Assignee: Hitachi Industry & Control Solutions, Ltd., Hitachi-shi (JP)

( * ) Notice: Subject to any disclaimer, the term of this patent is extended or adjusted under 35 U.S.C. 154(b) by 91 days.

(21) Appl. No.: 14/308,474

(22) Filed: Jun. 18, 2014

(65) Prior Publication Data

US 2014/0376814 A1    Dec. 25, 2014

(30) Foreign Application Priority Data

Jun. 19, 2013    (JP) ................. 2013-128081

(51) Int. Cl.
*G06K 9/40* (2006.01)
*G06K 9/46* (2006.01)
*G06T 5/00* (2006.01)
*G06K 9/00* (2006.01)

(52) U.S. Cl.
CPC .............. *G06K 9/46* (2013.01); *G06K 9/00791* (2013.01); *G06T 5/002* (2013.01); *G06T 5/008* (2013.01); *G06T 2207/20208* (2013.01); *G06T 2207/30236* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,580,835 B1 * | 6/2003 | Gallagher | G06T 7/0083 358/475 |
| 7,570,390 B2 | 8/2009 | Mitsunaga | |
| 8,311,356 B2 | 11/2012 | Shimizu et al. | |
| 8,648,937 B2 | 2/2014 | Kanemitsu et al. | |
| 9,153,015 B2 * | 10/2015 | Toyoda | H04N 5/21 |
| 2005/0123211 A1 | 6/2005 | Wong et al. | |
| 2013/0084021 A1 * | 4/2013 | Monobe | G06T 5/009 382/260 |

FOREIGN PATENT DOCUMENTS

| | | |
|---|---|---|
| JP | 4-273769 A | 9/1992 |
| JP | 2004-221645 A | 8/2004 |
| JP | 2007-18379 A | 1/2007 |
| JP | 2008-60722 A | 3/2008 |
| JP | 4109001 B2 | 4/2008 |
| JP | 2008-305122 A | 12/2008 |
| JP | 2012-175241 A | 9/2012 |
| WO | WO 2009/081485 A1 | 7/2009 |

OTHER PUBLICATIONS

Japanese Office Action issued in counterpart Japanese Application No. 2013-128081 dated Oct. 20, 2015 with English translation (six pages).

* cited by examiner

*Primary Examiner* — Brian P Werner

(74) *Attorney, Agent, or Firm* — Crowell & Moring LLP

(57) ABSTRACT

An image signal processing apparatus includes an image signal input unit, a local information acquisition unit for calculating a statistical quantity of pixel values in a local area including a noted pixel from an image signal as local information, a noise correction unit for conducting noise correction on the image signal by using the local information and outputting a noise-corrected image signal, an image signal correction unit for conducting signal level correction on the image signal from the noise correction unit and outputting a level-corrected image signal, an image signal correction intensity control unit for determining correction intensity in the level correction and changing input-output characteristics in the level correction, a signal correction characteristic estimation unit for estimating level correction characteristics based on the correction intensity, and a noise correction intensity control unit for controlling correction intensity in the noise correction in conjunction with the level correction characteristics.

17 Claims, 18 Drawing Sheets

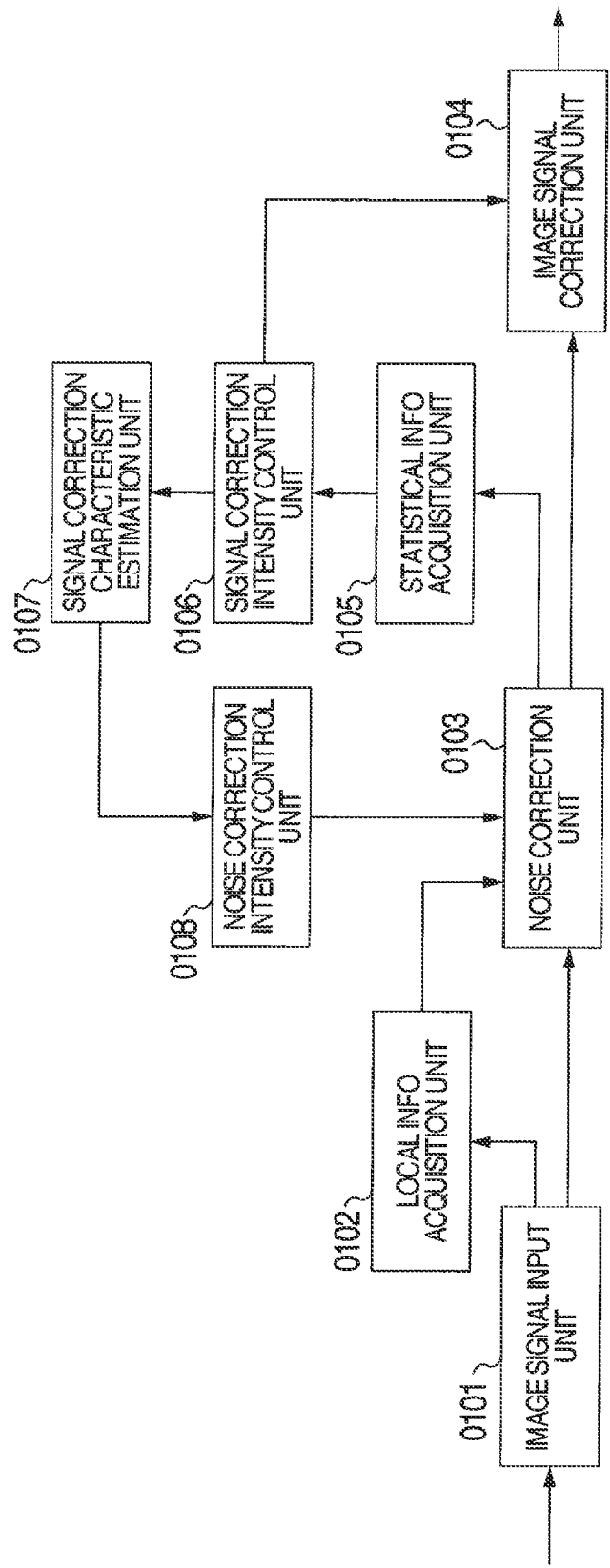

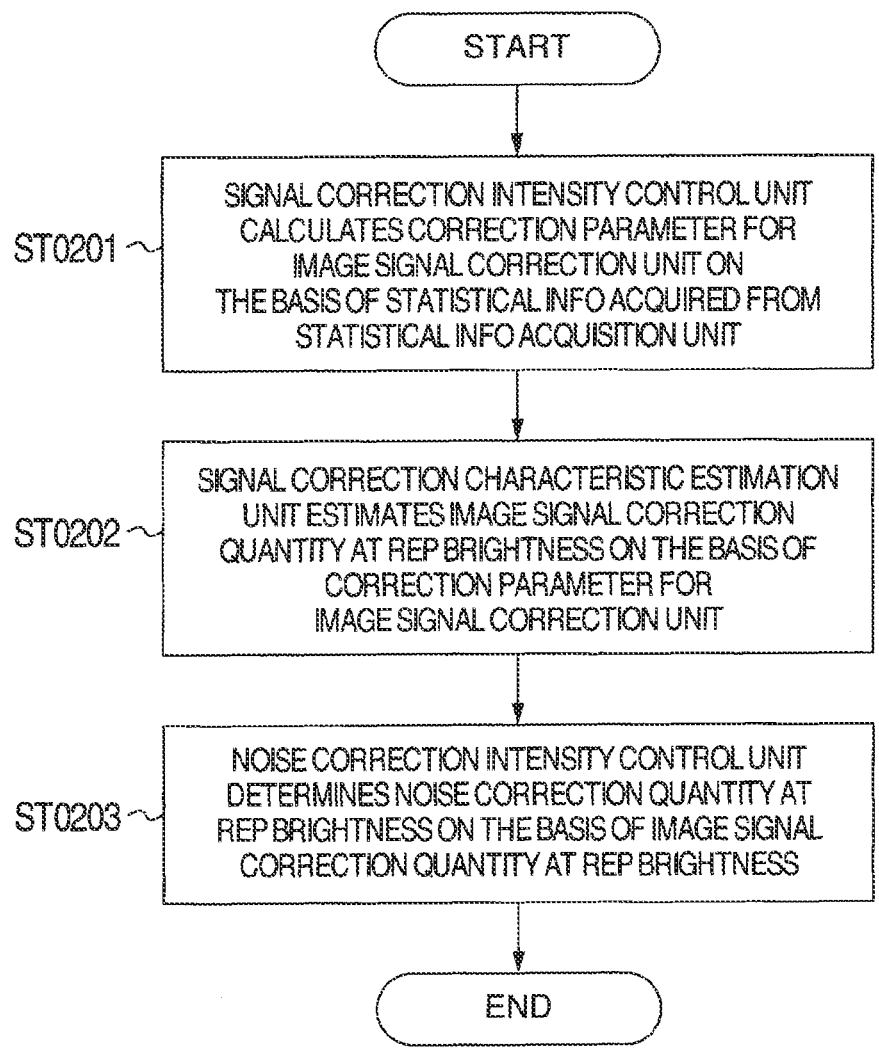

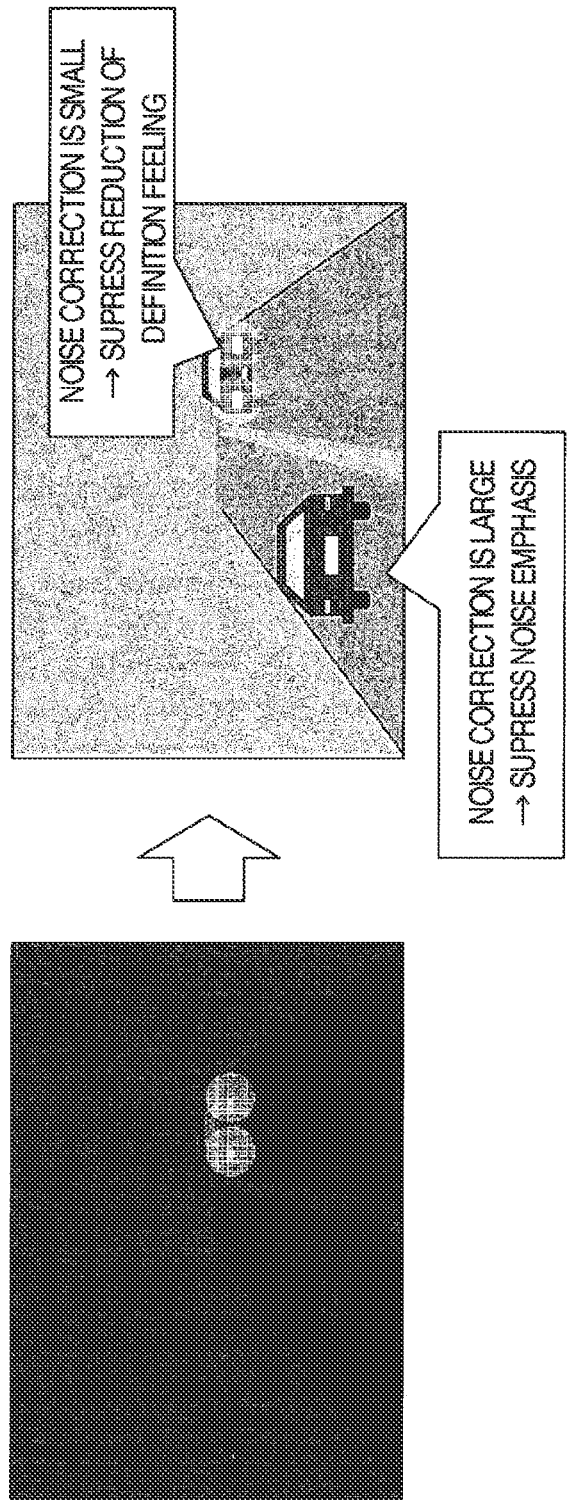

IMAGE PROCESSING APPARATUS AND IMAGING APPARATUS WITH NOISE CORRECTION FUNCTION AND SIGNAL LEVEL CORRECTION FUNCTION

INCORPORATION BY REFERENCE

The present application claims priority from Japanese application JP 2013-128081 filed on Jun. 19, 2013, the content of which is hereby incorporated by reference into this application.

BACKGROUND OF THE INVENTION

The present invention relates to an image signal processing apparatus. For example, the present invention relates to an image signal processing apparatus that conducts noise correction and various image corrections which change a signal level.

As a background field of the present technique, there is, for example, JP-B-4109001 (Patent Literature 1). A technique disclosed in JP-B-4109001 has an object represented as "the present invention provides a new picture quality correction method that improves picture quality correction by conducting favorable noise removal on an image when conducting prescribed picture quality correction such as contrast correction and brightness correction." The technique disclosed in JP-B-4109001 is "configured to include (1) a process for calculating a correction quantity of picture quality correction on a level value of an image on the basis of the level value, (2) a process for determining a removal f noise on the basis of a correction quantity in a region of an image to which noise removal processing is applied or its nearby region, (3) a process for removing noise by taking a region of the image as a unit and in accordance with the determined noise removal intensity, and (4) a process for conducting picture quality correction on the image with noise removed, when conducting the prescribed picture quality correction on an image."

SUMMARY OF THE INVENTION

In recent years, practical use of an image correction function in which improvement of visibility in various scenes is implemented by conducting signal expansion, gray level correction, or the like using image processing by referring to a histogram of the whole of the input image or each region has been advanced. As the image correction function, there are, for example, a backlight correction function, a fog-haze correction function, a wide dynamic range function, and the like. The image correction function is adopted in public welfare cameras, supervisory cameras, and the like. If signal expansion or gray level correction is conducted at this time, a noise component included in a signal is also emphasized. Therefore, it is desirable to control noise correction processing as preprocessing on the ground of characteristics of signal expansion and gray level correction using the image correction function.

In the Patent Literature 1, it is necessary to previously calculate a correction quantity of picture quality correction in a process for determining the noise removal quantity. Especially if complicated picture quality correction is conducted, the calculation load becomes enormous. This results in a problem that the cost increases and the real time property for dynamic scenes in a moving picture is hampered. Furthermore, it is possible to attempt to improve the performance of picture quality correction by determining the correction quantity of picture quality correction on the basis of an image signal after noise removal. In the present configuration, however, it cannot be implemented.

An object of the present invention is to provide an imaging apparatus having a high picture quality and high visibility. For example, a higher picture quality and visibility improvement using suitable noise correction and image correction irrespective of the subject, imaging scene and imaging condition are implemented at low cost and in real time by estimating correction characteristics of a signal every representative (rep) brightness on the basis of a control quantity of a correction intensity in image correction processing and controlling a correction intensity of noise correction of every brightness in conjunction with a result of the estimation.

In order to achieve the object, for example, a configuration described in Claims is adopted.

According to the present invention, a higher picture quality and visibility improvement using noise correction and image correction can be implemented at low cost and in real time.

Other objects, features and advantages of the invention will become apparent from the following description of the embodiments of the invention taken in conjunction with the accompanying drawings.

BRIEF DESCRIPTION OF THE DRAWINGS

FIG. 1 is a first schematic diagram showing an image signal processing apparatus according to a first embodiment of the present invention;

FIG. 2 is a diagram showing an example of a processing sequence concerning noise correction intensity control in the image signal processing apparatus according to the first embodiment of the present invention;

FIG. 5C is a diagram showing an example of an effect of control of noise correction intensity according to the first embodiment of the present invention;

DESCRIPTION OF THE EMBODIMENTS

Figure 3A:
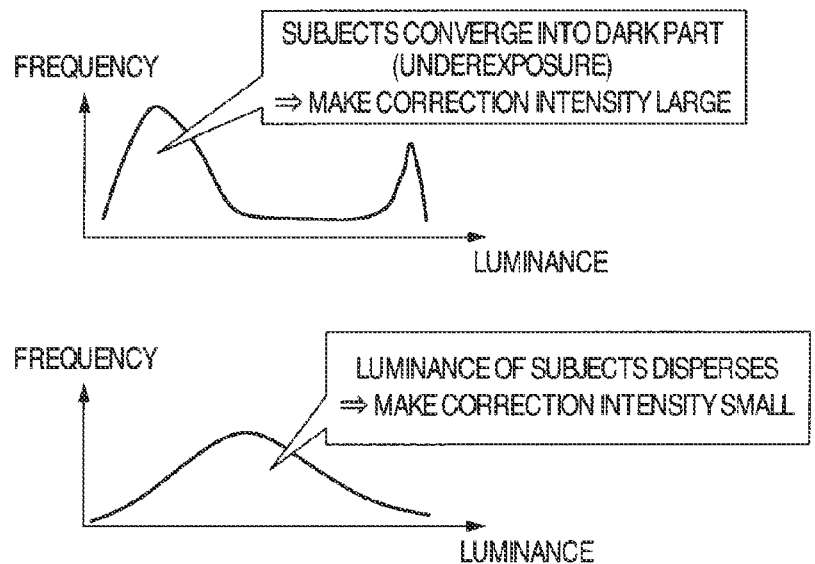
FIG. 3A is a diagram showing an example of a correction intensity control method in signal level correction using statistical information (info) according to the first embodiment of the present invention.

Hereafter, embodiments of the present invention will be described with reference to the drawings.

<<First Embodiment>>

FIG. 1 is a first schematic diagram showing an image signal processing apparatus according to a first embodiment of the present invention. In FIG. 1, reference numeral 0101 denotes an image signal input unit, 0102 a local information (info) acquisition unit, 0103 a noise correction unit, 0104 an image signal correction unit, 0105 a statistical information acquisition unit, 0106 a signal correction intensity control unit, 0107 a signal correction characteristic estimation unit, and 0108 a noise correction intensity control unit.

In the image signal processing apparatus shown in FIG. 1, the image signal input unit 0101 is connected to an imaging device or a video device via a capture board, a LAN, a USB or the like connected to a video cable, and an image signal is input to the image signal input unit 0101. Or it is also possible to take a form in which the image signal input unit 0101 includes a lens, an imaging element and an A/D conversion unit and generates an image signal by conducting imaging processing. Or it is also possible to take a form in which the image signal input unit 0101 reads an image signal previously stored in an image recording unit which is not illustrated.

The local information acquisition unit 0102 acquires an image signal which is output from the image signal input unit 0101, calculates local brightness for each pixel, and outputs information of the calculated brightness. As for a method of calculating the local brightness, in a case where the image signal has a luminance signal as in a video signal, the pixel value may be regarded as brightness of a noted pixel as it is. Influence of noise or a pattern may be reduced by finding a weighted average in pixel value of the noted pixel and its neighboring pixels. Furthermore, if the image signal is raw data which is output from imaging elements in the Bayer arrangement, it is also possible to find a weighted average in pixel value of the noted pixel and its neighboring pixels having the same color as the noted pixel and use the weighted average as brightness information. Furthermore, if the image signal is color data like RGB data, it is also possible to regard a signal obtained by previously conducting weighted averaging on data of respective colors as a luminance signal, then find a weighted average in pixel value of a noted pixel and its neighboring pixels, and use the weighted average as brightness information. Furthermore, it is also possible to reduce the computation quantity by calculating brightness information at constant intervals without calculating brightness information every pixel and causing a plurality of pixels to share the brightness information.

The noise correction unit 0103 acquires an image signal which is output from the image signal input unit 0101, executes signal processing such as two-dimensional noise correction processing using a smoothing filter such as a Gaussian filter or a spatial filter effective to remove noise components such as a median filter, with different correction intensity with respect to brightness information calculated by the local information acquisition unit 0102 for each of pixels included in the image signal, or three-dimensional noise correction processing which corrects random noise by finding a weighted average of signal levels in the time axis direction in a case where the image signal which is output from the image signal input unit 0101 is a moving picture, generates an image signal, the noise of which has been corrected, and outputs a resultant image signal. As for correlation between brightness information of the noted pixel and correction intensity at that time, it is possible to previously store a correspondence relation which becomes a reference in a function, a table or the like, and determine the correlation on the basis of the correspondence relation. By the way, it is possible to freely adjust correction intensity of every brightness by further correcting the correspondence relation which becomes a reference, by use of correction parameters found by user's operation, automatic computation or the like.

Furthermore, as for the correspondence relation which becomes a reference, reduction of a table size may be attempted by storing only a plurality of correlations between representative brightness and correction intensity and calculating correlation of correction intensity for intermediate brightness. Furthermore, as a scheme of noise correction processing, it is also possible to use a configuration capable of removing noise components differing in characteristics by using a multi-stage combination of a plurality of kinds of two-dimensional noise correction processing or three-dimensional noise correction processing differing in characteristics, or conducting different processing on the same input signal in parallel and then combining results. Furthermore, it is also possible to use a configuration capable of removing only noise effectively while leaving definition feeling of edges by separating an input image signal into low frequency components and high frequency components in preprocessing and conducting different noise correction processing on the low frequency components and the high frequency components.

The image signal correction unit 0104 determines input-output characteristics of the image signal on the basis of correction intensity in signal level correction which is output by the signal correction intensity control unit 0106, corrects a signal level, which is a signal value of every pixel in the image signal output from the noise correction unit 0103, on the basis of the input-output characteristics, and generates an output signal. The correction of the image signal executed by the image signal correction unit 0104 includes correction of a crushed signal caused by underexposure at the time of backlight, fog-haze correction, dynamic range widening processing, and the like conducted by correcting a signal level. The correction of the image signal can be implemented by, for example, previously holding correspondence of an output value to an input value as a coefficient of a function or a lookup table of correspondence, correcting the coefficient of the function or values in the lookup table on the basis of the correction intensity in signal level correction, determining input-output characteristics, and converting the signal level of the image signal on the basis of the input-output characteristics.

Furthermore, it is also possible to previously hold a plurality of function coefficients or correspondence lookup tables for correction corresponding to a plurality of brightness or correction intensity values, and select a function coefficient or a correspondence lookup table to be used on the basis of correction intensity output by the signal correction intensity control unit 0106 at the time of processing or use them with interpolation, in order to reduce the computation cost.

If the image signal which is input to the image signal correction unit 0104 is a luminance signal, brightness correction can be conducted by correcting a pixel value of each pixel on the basis of input-output characteristics. Furthermore, it is also possible to use a configuration capable of conducting brightness correction even with the RGB signal or the like by calculating brightness information in processing similar to that in the local information acquisition unit 0102 instead of the luminance signal, correcting only the brightness information on the basis of input-output characteristics, finding an input-output ratio of the brightness information, and correcting pixel values of the original image signal on the basis of the input-output ratio of the brightness information. Furthermore, it is also possible to separate the input image signal into a plurality of components, conduct different correction processing on the components, and combine resultant components. For example, if the input image signal is separated into a low frequency component and a high frequency component in preprocessing and the low frequency component is regarded as brightness information, it is possible to correct brightness of the subject and definition feeling of edges respectively by conducting different signal level correction processing on each of the low frequency component and the high frequency component. Furthermore, it is also possible to conduct optimum correction from subject to subject in an image by conducting signal level correction processing with different input-output characteristics from area to area in the image signal.

By the way, as for the noise correction processing executed in the noise correction unit 0103 and the signal level correction processing executed in the image signal correction unit 0104, in a case where the image signal has a luminance signal and a color signal as in a video signal, processing of the same characteristics should be executed to make a ratio between the luminance signal and the color signal in the output nearly equal to that in the input. Or it is also possible to attempt to optimize the performance or the calculation cost by using a configuration that executes processing of different characteristics on the luminance signal and the color signal or that executes processing on only either one of the signals.

The statistical information acquisition unit 0105 is supplied with the image signal that is output by the noise correction unit 0103, as an input. The statistical information acquisition unit 0105 measures statistical information of the signal value and outputs the statistical information. Here, the statistical information is, for example, histogram distribution of a signal value of each pixel in the image signal or a statistical quantity such as an average value, a maximum value, a minimum value, or a standard deviation of the signal value. The statistical information is information used to make the correction intensity proper when the signal correction intensity control unit 0106 discriminates a scene in the image signal and the image signal correction unit 0104 corrects the signal level. At this time, improvement of the scene discrimination performance may be attempted by acquiring statistical information of signal values of pixels in a predetermined area in the image signal, acquiring statistical information of signal values of pixels in an area where an subject detected by image recognition exists, or acquiring statistical information concerning only pixels having signal values in a predetermined range. For example, in a case where the image signal correction unit 0104 conducts signal level correction processing with different input-output characteristics from area to area in the image signal, optimum signal level correction processing can be implemented every area by acquiring statistical information with a unit conformed to the area.

The signal correction intensity control unit 0106 discriminates a scene in the image signal on the basis of the statistical information which is output by the statistical 16 information acquisition unit 0105, and determines correction intensity every brightness at the time when the image signal correction unit 0104 corrects the signal level. In a case where the image signal correction unit 0104 conducts signal level correction processing with different input-output characteristics from area to area in the image signal, the signal correction intensity control unit 0106 may acquire measured statistical information with a unit conformed to the area and determine the correction intensity every area. A control method of correction intensity in this signal level correction processing will be described later with reference to FIGS. 3A and 3B.

The signal correction characteristic estimation unit 0107 estimates a signal correction characteristic which is an evaluation value indicating how much the signal was amplified every brightness by the signal level correction conducted by the image signal correction unit 0104 on the basis of the correction intensity determined by the signal correction intensity control unit 0106. As for the estimation of the signal correction characteristic, for example, in a case where positive correlation is provided to make the signal correction quantity larger as the correction intensity in signal level correction becomes large, a result obtained by providing the correction intensity in signal level correction with a weight of each brightness should be regarded and handled as the signal correction characteristic. Furthermore, the precision may be improved by calculating the signal correction quantity from the correction intensity in signal level correction on the basis of a function coefficient or a conversion table which associates the correction intensity in the signal level correction with the signal correction characteristic.

The noise correction intensity control unit 0108 determines the correction intensity every brightness in noise correction processing conducted by the noise correction unit 0103 and exercises control on the basis of the signal correction characteristic estimated by the signal correction characteristic estimation unit 0107. It becomes possible for the noise correction unit 0103 to conduct proper noise correction according to correction quantity values of respective pixels in the image signal correction unit 0104 by conducting noise correction on the basis of the correction intensity. The statistical information acquisition unit 0105 may have a configuration that acquires statistical information from the image signal that is output by the image signal input unit 0101 instead of the image signal that is output by the noise correction unit 0103. Furthermore, the signal correction intensity control unit 0106 may have a configuration that does not use the statistical information output by the statistical information acquisition unit 0105, but that determines a value input from an input unit which is not illustrated, as the correction intensity in the signal level correction processing. Although in this case control of the correction intensity based on a scene in the image signal cannot be exercised, the statistical information acquisition unit 0105 can be omitted and it is possible to attempt to reduce the calculation time in a case of implementation using software and the development cost in a case of implementation using hardware.

By the way, the image signal processing apparatus shown in FIG. 1 has been described paying attention to processing units directly relating to the present embodiment. However, other picture quality improving processing, signal format conversion processing, compression/expansion processing, or the like that is important in actually conducting image processing may be executed before or after each processing or in the middle of each processing.

Furthermore, as for the local information acquisition processing, the noise correction processing, the signal level correction processing, the statistical information acquisition processing, the correction intensity control processing in the signal level correction, the signal correction characteristic estimation processing, and the correction intensity control processing in the noise correction, for example, in the case of a personal computer, the above-described kinds of processing are executed by a CPU which develops a program stored in an HDD or the like onto a memory and conducts arithmetic operations in accordance with the program. In the case of a built-in device, the above-described kinds of processing are executed by a microcomputer, a DSP, a dedicated LSI, or the like. Furthermore, optimization of the cost or performance may be attempted by causing a DSP or a dedicated LSI to execute the local information acquisition processing, the noise correction processing, the signal level correction processing, and the statistical information acquisition processing which are signal processing and causing a microcomputer to execute the correction intensity control processing in the signal level correction, the signal correction characteristic estimation processing, and the correction intensity control processing in the noise correction which are control processing. In order to simplify the description, the present embodiment and ensuing embodiments will be described supposing that respective processing units execute respective kinds of processing even in the case the local information acquisition processing, the noise correction processing, the signal level correction processing, the statistical information acquisition processing, the correction intensity control processing in the signal level correction, the signal correction characteristic estimation processing, and the correction intensity control processing in the noise correction are executed by a CPU which conducts arithmetic operations in accordance with a program.

Furthermore, the image signal processing apparatus shown in FIG. 1 may have a configuration implemented by a plurality of kinds of software and a plurality of kinds of hardware. For example, the image signal processing apparatus may have a configuration in which the local information acquisition processing, the noise correction processing, the signal level correction processing, and the statistical information acquisition processing are executed in a different DSP or a dedicated LSI and the correction intensity control processing in the signal level correction, the signal correction characteristic estimation processing, and the correction intensity control processing in the noise correction are executed in a common microcomputer. Furthermore, the image signal processing apparatus may have a configuration in which the local information acquisition processing, the noise correction processing, the signal level correction processing, and the correction intensity control processing in the noise correction are executed in a first DSP and a microcomputer and the signal level correction processing, the statistical information acquisition processing, the correction intensity control processing in the signal level correction, and the signal correction characteristic estimation processing are executed in a second DSP and a microcomputer. Or the image signal processing apparatus may have a configuration in which one kind of processing is implemented by a plurality of programs or a plurality of LSIs.

FIG. 2 is a diagram showing an example of a processing sequence concerning noise correction intensity control in the image signal processing apparatus according to the first embodiment of the present embodiment. The noise correction intensity processing sequence shown in FIG. 2 is executed by the signal correction intensity control unit 0106, the signal correction characteristic estimation unit 0107, and the noise correction intensity control unit 0108 shown in FIG. 1.

In ST0201 in the processing sequence concerning the noise correction intensity control shown in FIG. 2, the signal correction intensity control unit 0106 calculates the correction intensity in the signal level correction processing conducted by the image signal correction unit 0104 as a correction parameter, on the basis of the statistical information acquired from the statistical information acquisition unit 0105, and outputs the correction parameter to the image signal correction unit 0104. A control method of the correction intensity in the signal level correction processing used by the signal correction intensity control unit 0106 will be described later with reference to FIGS. 3A and 3B.

In ST0202, the signal correction characteristic estimation unit 0107 estimates an image signal correction quantity at each of a plurality of predetermined representative brightness values with an input image signal taken as reference on the basis of the correction parameter calculated for the image signal correction unit 0104. A control method in the signal correction characteristic estimation processing used by the signal correction characteristic estimation unit 0107 will be described later with reference o FIGS. 4A and 4B.

In ST0203, the noise correction intensity control unit 0108 determines a noise correction quantity at representative brightness on the basis of the image signal correction 16 quantity at representative brightness calculated by the signal correction characteristic estimation unit 0107, and outputs the noise correction quantity to the noise correction unit 0103. A control method in the correction intensity control processing in noise correction conducted by the noise correction intensity control unit 0108 will be described later with reference to FIGS. 5A, 5B and 5C. As a result, suitable noise correction is previously conducted in accordance with a correction quantity for each brightness value in the signal level correction processing conducted by the image signal correction unit 0104. Consequently, it is prevented that noise is also emphasized together at the time of the signal level correction, and a higher picture quality becomes possible.

By the way, the statistical information acquisition unit 0105 calculates statistical 26 information from the image signal after the noise correction which is output from the image signal correction unit 0104, and the noise correction intensity control unit 0108 controls the correction intensity with which the noise correction unit 0103 conducts noise correction. Therefore, the timing order in control becomes reverse. When conducting still picture processing, therefore, the above-described processing can be implemented by conducting loop processing which includes executing the noise correction with an initial value of the correction intensity, controlling the correction intensity in the signal level correction processing by using statistical information obtained from an image after the noise correction, determining correction intensity in noise correction anew from an estimation result of the image signal correction quantity at that time, and a series of processing is repeated again. On the other hand, when the present configuration conducts moving picture processing in which a continuous imaging signal is input and a series of processing is conducted every frame, an imaging object does not change largely between frames. Therefore, estimation processing of a signal correction characteristic and noise correction intensity control processing in a current frame can be conducted by using statistical information calculated by the statistical information acquisition unit 0105 in the last frame. Noise correction processing and image signal correction processing adapted to the scene in real time can be conducted.

By the way, in a case where the imaging object has changed largely between frames, there is a possibility that reliability of the statistical information in the last frame might have been hampered. Therefore, it is possible to prevent excessive correction from being executed by returning the correction intensity in the noise correction processing to the initial value without referring to the statistical information in the last frame.

In the scheme based on the present embodiment, not the output result of the actual image signal correction processing, but the estimated value of the correction quantity based upon the correction parameter is used to control the correction intensity in the noise correction processing. Therefore, the image signal correction processing need only be conducted once in one frame period on a latter part of the noise correction processing. In a case where moving picture processing is conducted in a video camera, therefore, noise correction processing can be conducted in conjunction with the correction characteristic in the image signal correction processing by only conducting the noise correction processing once and the image signal correction processing once during one frame period. As a result, the circuit scale at the time of implementation using hardware and the computation cost at the time of implementation using software can be reduced. In particular, even if processing of a complicated input-output characteristic is conducted as the image signal correction processing and the circuit scale increases, the present configuration needs only addition of control processing using software. As a result, remarkable increase of the cost can be prevented.

Furthermore, there is also a merit that the statistical information acquisition unit 0105 can conduct scene discrimination with high precision by calculating statistical information hardly influenced by noise from the image signal after the noise correction which is output from the noise correction unit 0103, and the visibility improvement using the image signal correction processing can be conducted with high precision.

FIG. 3 is a first diagram showing an example of a correction intensity control method in signal level correction according to the first embodiment of the present embodiment.

Figure 3B:
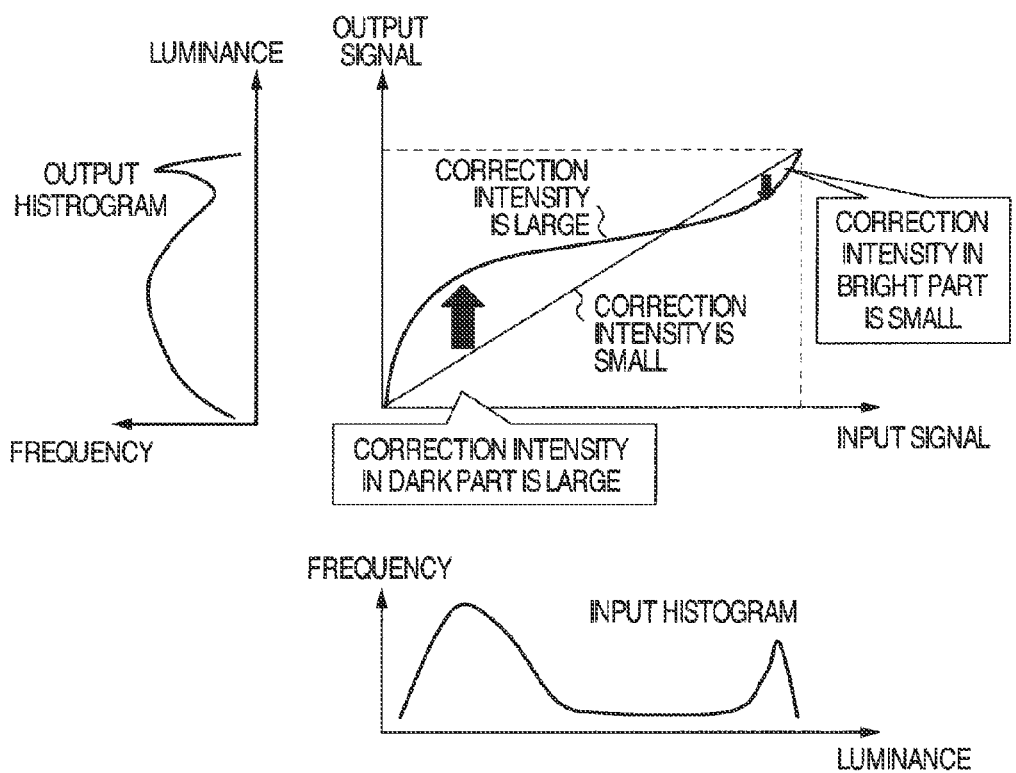
FIG. 3B is a diagram showing an example of a signal level correction method used by an image signal correction unit 0104 on the basis of determined correction intensity, according to the first embodiment of the present invention.

In the present embodiment, the correction intensity control processing in signal level correction is executed by the signal correction intensity control unit 0106. FIG. 3A is a diagram showing an example of a correction intensity control method in signal level correction using the statistical information. FIG. 3B is a diagram showing an example of a signal level correction method conducted by the image signal correction unit 0104 on the basis of the determined correction intensity. In this example, in a case where the illuminance difference is very large and a black-out occurs or backlight or strong light is projected into an angle of view and automatic exposure becomes under as a whole, resulting in a black-out of a principal subject, contrast correction that improves black-out of a dark subject without causing white-out of a bright subject.

As shown in FIG. 3A, the statistical information acquisition unit 0105 acquires a luminance histogram of an image signal, and evaluates the degree of black-out caused by underexposure on the basis of statistical information such as the center of gravity or variance of luminance of a dark part. For example, if the center of gravity of luminance of the dark part is low and variance thereof is small, black-out can be judged to be occurring. At this time, it is also possible to further determine whether a subject of high luminance exists, and determine on the basis of a result thereof whether underexposure is occurring due to backlight or strong light. For example, unless a high luminance subject exists, the state should be regarded as underexposure and processing for making the screen bright such as exposure control, gain processing and gamma processing should be conducted. On the other hand, in a case where a subject of high luminance exists, making the entire screen bright simply causes complete white-out of the subject. Therefore, it is desirable to conduct signal level correction of every brightness such as making a dark place bright and making a bright place dark.

In a case where underexposure is judged to be occurring as a result of the above-described determination, therefore, control is exercised to make the correction intensity of the image signal correction intensity of the image signal correction unit 0104 large. In a case where underexposure is judged not to be occurring, control is exercised to make the correction intensity of the image signal correction unit 0104 small. In a case where the correction intensity determined by the signal correction intensity control unit 0106 is large, the image signal correction unit 0104 increases inclination of a dark part and inclination of a bright part in the input-output characteristic as shown in FIG. 3B. In a case where the correction intensity is small, the image signal correction unit 0104 makes the input-output characteristic close to linear. At this time, it becomes possible to expand the contrast of the dark part without lowering the contrast of the bright part and improve the black-out by making the correction quantity of the dark part greater than the correction quantity of the bright part.

In the present example, control in which the correction quantity of the dark part and the correction quantity of the bright part are changed simultaneously with one value of correction intensity is shown to facilitate understanding. However, it is also possible to exercise control in which each of the correction intensity of the dark part and the correction intensity of the bright part can be changed in accordance with the shape of a histogram. Furthermore, it is also possible to exercise control in which different input-output characteristics are provided for the dark part and the bright part, the correction intensity is set to be changeable according to the shape of each histogram, the input signal is compared with a predetermined threshold, and an input-output characteristic to be used is selected according to the comparison. In the case where these kinds of control are used, the degree of freedom of correction is further improved, and consequently it becomes possible to conduct correction more suitable for the imaging scene.

Figure 4A:
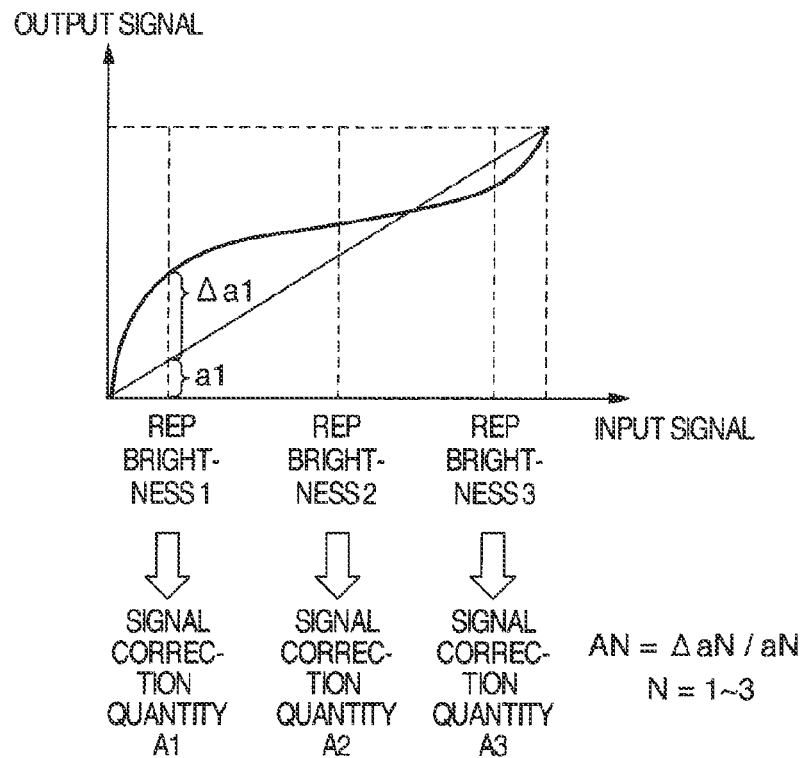
FIG. 4A is a first diagram showing an example of signal correction characteristic estimation processing according to the first embodiment of the present invention.
Figure 4B:
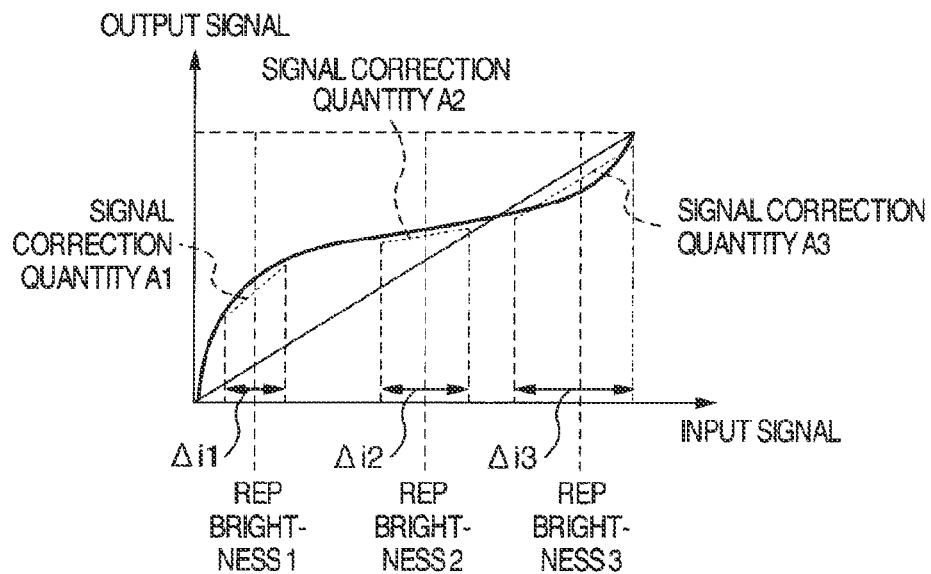
FIG. 4B is a second diagram showing an example of signal correction characteristic estimation processing according to the first embodiment of the present invention.

FIGS. 4A and 4B are diagrams showing an example of a control method in signal correction characteristic estimation processing according to the first embodiment of the present embodiment.

In the present embodiment, signal correction characteristic estimation processing is executed in the signal correction characteristic estimation unit 0109. FIG. 4A is a first diagram showing an example of signal correction characteristic estimation processing. FIG. 4B is a second diagram showing an example of signal correction characteristic estimation processing.

As shown in FIG. 4A, the signal correction characteristic estimation unit 0107 acquires signal levels a1 to a3 of the input signal and difference values between the output signal and the input signal, i.e., correction quantity values $\Delta a1$ to $\Delta a3$ at representative brightness values 1 to 3, respectively. And the signal correction characteristic estimation unit 0107 calculates ratios $\Delta a1/a1$ to $\Delta a3/a3$ as estimated values A1 to A3 of signal correction quantity values at respective brightness values. As a result, it is possible to easily infer to what degree noise is emphasized in conformity with a gain value of the signal.

Furthermore, as shown in FIG. 4B, the signal correction characteristic estimation unit 0107 may calculate inclination values of input-output characteristics for ranges $\Delta i1$ to $\Delta i3$ of signal level of a local input signal including representative brightness respectively at representative brightness values 1 to 3, respectively as estimated values A1 to A3 of the signal correction quantity. In this case, when random noise at a certain signal level occurs in Gaussian distribution, it is possible to easily infer to what degree random noise is emphasized in conformity with the expansion quantity of the signal, from the estimated values of the signal correction quantity. At this time, width values of $\Delta i1$ to $\Delta i3$ may be made different from each other considering that variance of noise differs depending upon the signal level of the input signal. As a result, it is possible to estimate the image signal correction quantity at a plurality of predetermined representative bright values adaptively according to the correction intensity in the image signal correction unit 0104, and it becomes possible to infer to what degree noise is also emphasized.

Figure 5A:
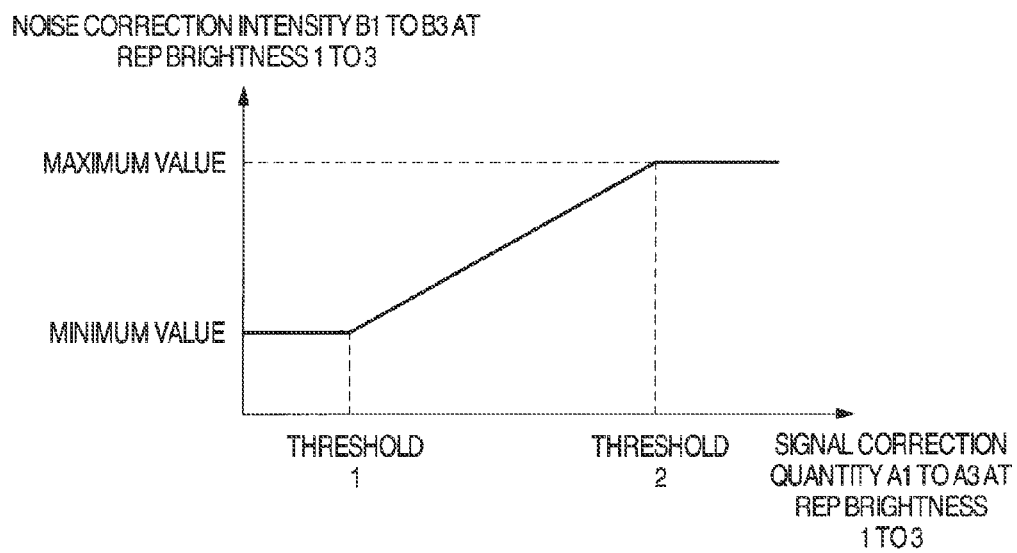
FIG. 5A is a diagram showing an example of a control method of noise correction intensity using a signal correction quantity at representative brightness according to the first embodiment of the present invention.
Figure 5B:
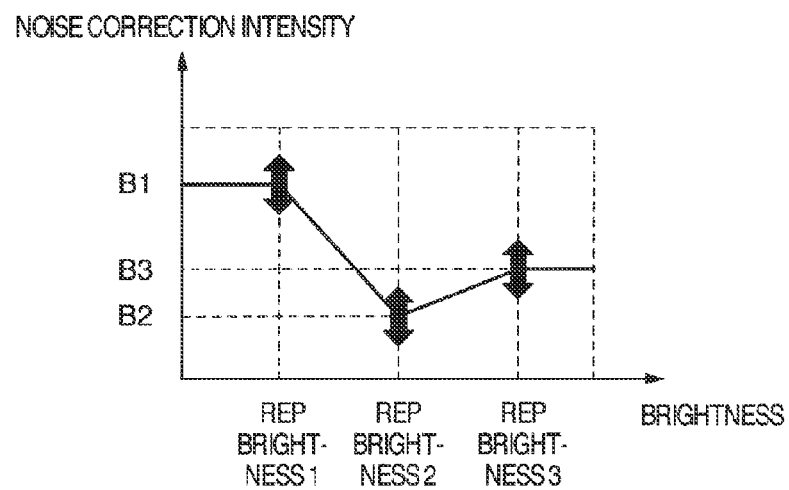
FIG. 5B is a diagram showing an example of a control method of noise correction intensity of every brightness according to the first embodiment of the present invention.

FIGS. 5A and 5B are diagrams showing an example of a correction intensity control method in noise correction according to the first embodiment of the present embodiment. In the present embodiment, correction intensity control processing in noise correction is executed in the noise correction intensity control unit 0108. FIG. 5A is a diagram showing an example of a control method of noise correction intensity using a signal correction quantity at representative brightness. FIG. 5B is a diagram showing an example of a control method of noise correction intensity at each brightness. FIG. 5C is a diagram showing an example of an effect of suppression of noise correction intensity.

As shown in FIG. 5A, the noise correction intensity control unit 0108 controls correction intensity values B1 to B3 in noise correction processing of every brightness value in the noise correction unit 0103, on the basis of the signal correction quantity values A1 to A3. At this time, the correction intensity in noise correction processing is increased as the signal correction quantity becomes large. In a case where the signal correction intensity control unit 0106 conducts signal level correction processing to expand the signal, therefore, lowering of picture quality caused by that the noise component is also emphasized at the same time can be suppressed by intensifying the correction effect of noise according to the signal correction quantity. Even in a case where the effect of the signal level correction processing is weak, determinate noise correction can be conducted at this time by preventing the noise correction intensity from becoming less than a minimum value, for example, in a case where the signal correction quantity is less than a predetermined threshold 1 as shown in FIG. 5A.

Furthermore, in a case where the signal correction quantity is greater than a predetermined threshold 2, it is possible to prevent definition feeling from being hampered excessively due to excessive noise correction and prevent the noise correction intensity from exceeding a settable range by preventing the noise correction intensity from exceeding a maximum value. Furthermore, in FIG. 5A, the signal correction quantity and the noise correction intensity change linearly between the threshold 1 and the threshold 2 in order to simplify the description. However, control may be exercised to cause a nonlinear change. It is possible to further provide a threshold between, and exercise control to interpolate with a plurality of line segments. Or it is possible to provide correction intensity values discretely and exercise control to cause a discontinuous change. Furthermore, the relation between the signal correction quantity values A1 to A3 and the noise correction intensity values B1 to B3 is represented by the same input-output characteristics. However, it is also possible to provide different thresholds or inclinations at representative brightness values 1 to 3, and make the noise correction intensity stronger in a dark part where noise is apt to be conspicuous and make the noise correction intensity weaker in a bright part where noise is not apt to be conspicuous.

As shown in FIG. 5B, it is possible to determine corresponding noise correction intensity with respect to all local brightness values calculated by the local information acquisition unit 0102 and it becomes possible for the noise correction unit 0103 to conduct noise correction, by calculating noise correction intensity with interpolation at brightness other than the representative brightness.

By the way, in the present embodiment, three points indicating a dark part, an intermediate part, and a bright part are selected as representative brightness. However, the precision may be raised by setting all possible values of local brightness calculated by the local information acquisition unit 0102 as representative brightness. Or the computation load can be reduced by reducing the number of points.

For example, in a scene in which exposure becomes under and black-out occurs on the whole due to intense light of, for example, headlight, visibility of a subject in black-out can be improved while keeping visibility of vicinity of the head light by exercising correction intensity control in noise correction shown in the present embodiment, as shown in FIG. 5C. For a bright subject around the headlight at this time, reduction of definition feeling can be suppressed by weakening the noise correction. For dark subjects other than the bright subject around the headlight, emphasis of noise at the time when the signal is expanded can be suppressed. As a result, a video having a high picture quality and high visibility as a whole is obtained.

According to the present embodiment, optimum noise correction is executed depending upon the characteristics of signal level correction by determining the correction intensity in noise correction every brightness on the basis of control information of correction intensity in signal level correction in this way. As a result, it becomes possible to generate an image having a high picture quality and high visibility at low cost.

<<Second Embodiment>>

Figure 6:
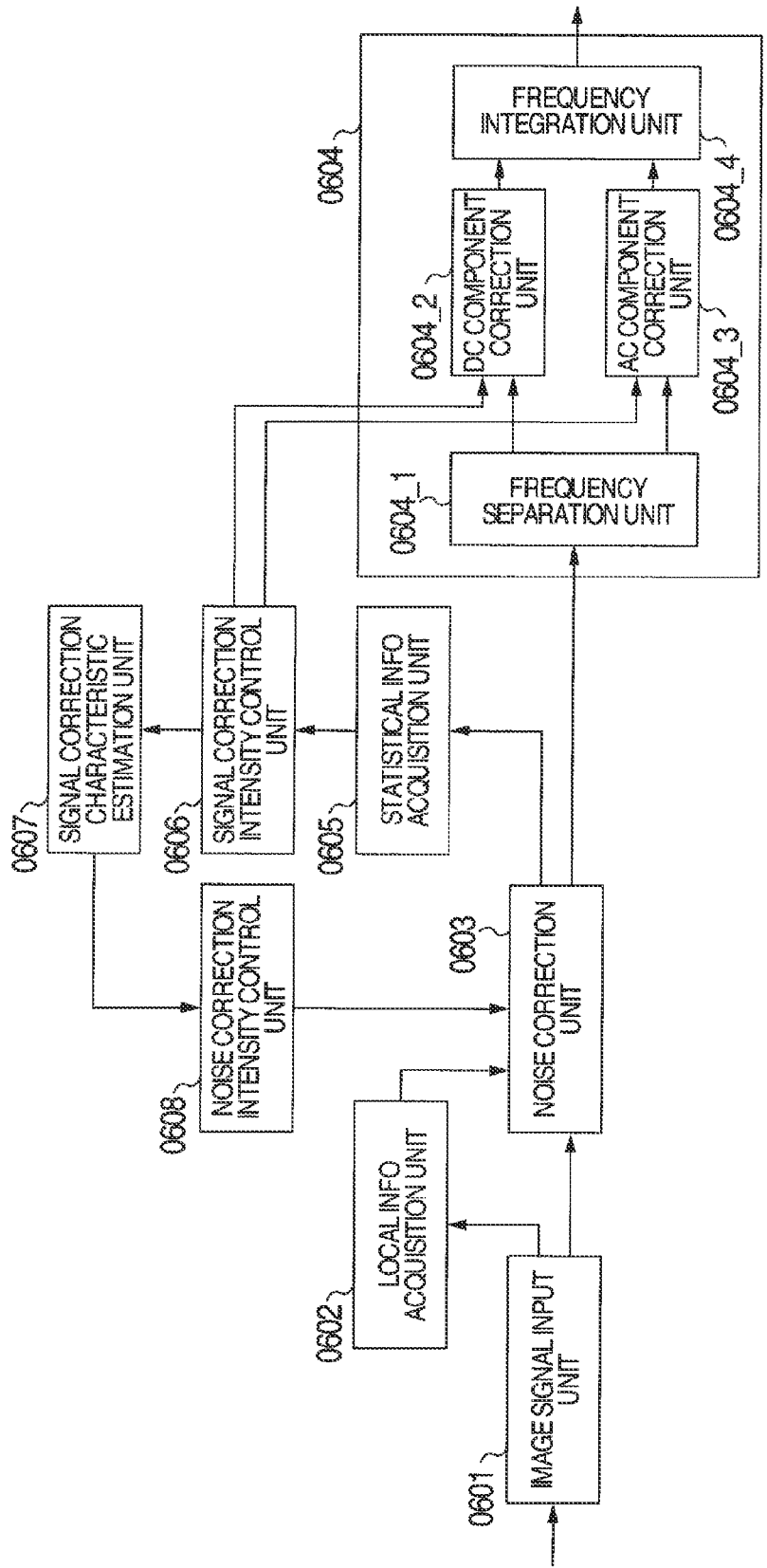
FIG. 6 is a schematic diagram showing an image signal processing apparatus according to a second embodiment of the present invention.

FIG. 6 is a schematic diagram showing an image signal processing apparatus according to a second embodiment of the present invention. In FIG. 6, reference numeral 0601 denotes an image signal input unit, 0602 a local information acquisition unit, 0603 a noise correction unit, 0604 an image signal correction unit, 0604_1 a frequency separation unit, 0604_2 a DC component correction unit, 0604_3 an AC component correction unit, 0604_4 a frequency integration unit, 0605 a statistical information acquisition unit, 0606_4 a signal correction intensity control unit, 0607 a signal correction characteristic estimation unit, and 0608 a noise correction intensity control unit. The image signal processing apparatus shown in FIG. 6 differs from the image signal processing apparatus shown in FIG. 1 in that the image signal correction unit 0604 includes the frequency separation unit 0604_1, the DC component correction unit 0604_2, the AC component correction unit 0604_3, and the frequency integration unit 0604_4 and a configuration capable of conducting different signal correction every frequency component is provided. By the way, a processing unit having the same name as that in the first embodiment has a function like that described in the first embodiment unless stated otherwise.

In the image signal processing apparatus shown in FIG. 6, the local information acquisition unit 0602 acquires an image signal which is output from the image signal input unit 0601, calculates a signal component of every frequency in a local area besides local brightness for each pixel, and outputs results. The signal component of every frequency can be calculated by, for example, conducting discrete cosine transform processing or applying a plurality of low pass filters, band pass filters, high pass filters or the like having different filter coefficients or filter sizes.

The noise correction unit 0603 acquires an image signal which is output from the image signal input unit 0601, executes signal processing such as two-dimensional noise correction processing using a smoothing filter such as a Gaussian filter or a spatial filter effective to remove noise components such as a median filter, with correction intensity depending upon local brightness or composition of signal components of every frequency in a local area calculated by the local information acquisition unit 0602 for each of pixels included in the image signal, or three-dimensional noise correction processing which corrects random noise by finding a weighted average of signal levels in the time axis direction in a case where the image signal which is output from the image signal input unit 0601 is a moving picture, generates an image signal, the noise of which has been corrected, and outputs a resultant image signal. Or it is possible to adopt a configuration in which noise in a desired frequency band is reduced by conducting inverse discrete cosine transform processing after the noise correction unit 0603 conducts correction with different correction intensity with respect to a signal component of every frequency calculated in the local information acquisition unit 0602 by conducting discrete cosine transform processing.

In the image signal correction unit 0604, the frequency separation unit 0604_1 separates the image signal which is output from the noise correction unit 0603 into components corresponding to respective frequency values, calculates a DC component which can be regarded as brightness information and a plurality of AC components corresponding to respective frequency values including much information of edges and noise, and outputs the DC component and the AC components. In the frequency separation processing, calculation can be conducted by conducting discrete cosine transform processing in the same way as the calculation processing of a signal component of every frequency conducted in the local information acquisition unit 0602 or applying a plurality of low pass filters, band pass filters, high pass filters or the like differing in filter coefficients or filter size. Furthermore, it is also possible to conduct processing based on the Retinex theory and calculate an illumination light component as a DC component and a reflected light component as an AC component.

The DC component correction unit 0604_2 determines input-output characteristics of the image signal on the basis of the correction intensity in signal level correction which is output by the signal correction intensity control unit 0606, corrects a signal level of the DC component which can be regarded as brightness information of the image signal on the basis of the input-output characteristics, and generates an output signal.

The AC component correction unit 0604_3 determines a correction gain of an AC component of every frequency on the basis of correction intensity in signal level correction which is output by the signal correction intensity control unit 0606, corrects the signal level of the AC component on the basis of the correction gain, and generates an output signal.

The frequency integration unit 0604_4 integrates the DC component and the AC components corrected in signal level by conducting inverse processing for the processing conducted in the frequency separation unit such as inverse discrete cosine transform processing, and outputs a resultant signal. As a result, it is possible to correct both brightness of the subject and definition feeling of edges and improve the visibility.

The signal correction intensity control unit 0606 discriminates a scene in the image signal on the basis of the statistical information which is output by the statistical information acquisition unit 0605, and determines correction intensity every brightness at the time when the image signal correction unit 0604 corrects the signal level, that is, the correction intensity of the DC component and the correction intensity of every frequency, i.e., the correction intensity of the AC component. Since the DC component can be regarded as brightness information in the noted pixel, a control method of the correction intensity of the DC component can be made the same as the example of the correction intensity control method in the signal level correction according to the first embodiment of the present invention shown in FIG. 3. Furthermore, a control method of the correction intensity of the AC component will be described later with reference to FIG. 7.

The signal correction characteristic estimation unit 0607 estimates a signal correction characteristic which is an evaluation value indicating how much the signal was amplified every brightness and every frequency by the signal level correction conducted by the image signal correction unit 0604 on the basis of the correction intensity determined by the signal correction intensity control unit 0606.

The noise correction intensity control unit 0608 determines the correction intensity every brightness and every frequency in noise correction processing conducted by the noise correction unit 0603 and exercises control on the basis of the signal correction characteristic estimated by the signal correction characteristic estimation unit 0607.

It becomes possible for the noise correction unit 0603 to conduct proper noise correction according to correction quantity values of respective pixels in the image signal correction unit 0604 by conducting noise correction on the basis of the correction intensity.

Figure 7:
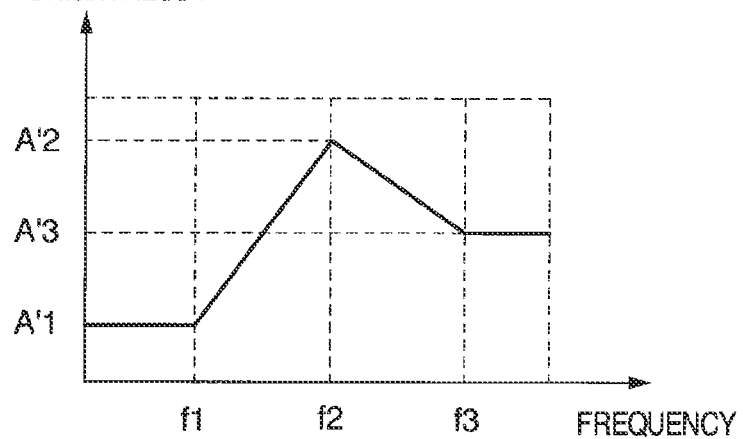
FIG. 7 is a diagram showing an example of a control method of AC component correction intensity according to the second embodiment of the present invention.

FIG. 7 is a diagram showing an example of a control method of correction intensity of the AC component according to a second embodiment of the present invention. In the present embodiment, the control processing of correction intensity of the AC component is executed by the signal correction intensity control unit 0606. The signal correction intensity control unit 0606 calculates AC component correction quantity values A'1 to A'3 respectively corresponding to representative frequency values f1 to f3 at each of representative brightness values 1 to 3. This is implemented by, for example, previously storing correspondences which become reference as a table. As a result, visibility can be improved by preferentially improving the definition feeling of frequency edges which are influential to look at. Furthermore, at this time, the correction quantity of the AC component may be increased or decreased by conducting gain processing according to the correction quantity of the DC component. As a result, in a subject for which the correction quantity of the DC component is large, the definition feeling of edges can be improved by making the correction quantity of the AC component at the same time. Conversely, in a subject for which the correction quantity of the DC component is large, suppression of noise emphasis may be given priority by making the correction quantity of the AC component small.

Figure 8A:
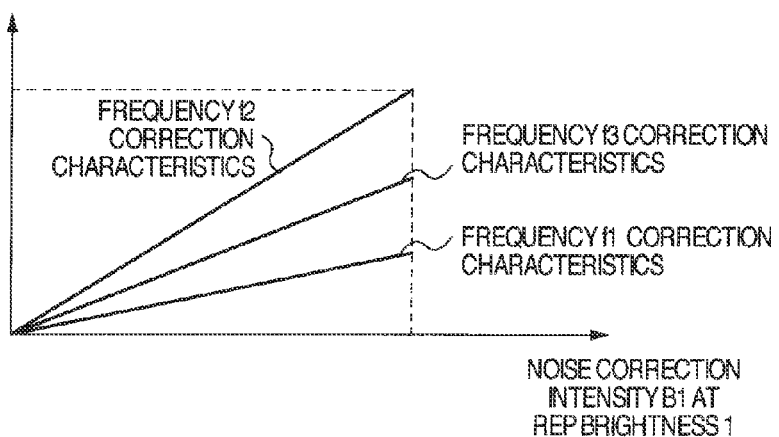
FIG. 8A is a diagram showing an example of a control method of noise correction intensity at each frequency in representative brightness according to the second embodiment of the present invention.
Figure 8B:
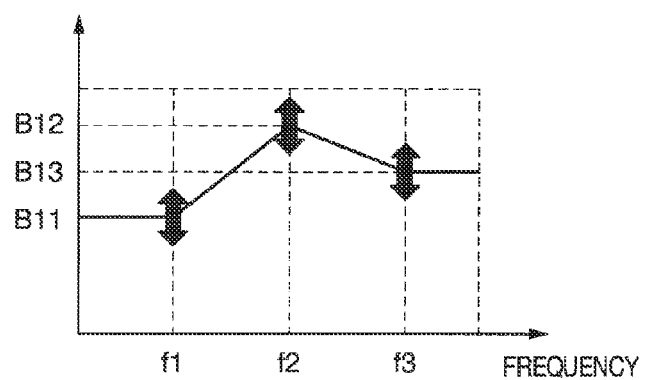
FIG. 8B is a diagram showing an example of a control method of noise correction intensity at each frequency according to the second embodiment of the present invention.

FIGS. 8A and 8B are diagrams showing an example of a correction intensity control method in noise correction according to the second embodiment of the present invention. In the present embodiment, correction intensity control processing in noise correction is executed in the noise correction intensity control unit 0608. FIG. 8A is a diagram showing an example of a control method of noise correction intensity corresponding to each frequency at representative brightness. FIG. 8B is a diagram showing an example of a control method of noise correction intensity for each frequency.

As shown in FIG. 8A, the noise correction intensity control unit 0608 calculates noise correction intensity values B1 to B3 of every representative brightness in the same way as the example of the correction intensity control method in noise correction according to the first embodiment of the present invention shown in FIGS. 5A, 5B and 5C. Thereafter, for the noise correction intensity B1 at the representative brightness 1, the noise correction intensity control unit 0608 calculates noise correction intensity values B11 to B13 corresponding to respective frequency values by conducting correction with different input-output characteristics for frequency values f1 to f3. For example, correction characteristics of noise correction intensity at frequency values f1 to f3 should be conformed to a ratio of every frequency of AC component correction in the AC component correction unit 0604_3. Although omitted in FIG. 8A, similar correction is also conducted for noise correction intensity values B2 and B3 at representative brightness 2 and 3. At this time, correction characteristics of noise correction intensity may be changed from brightness to brightness. For example, it is possible to make the correction characteristics of noise correction intensity smaller at the representative brightness 1 which is a dark part and make the correction characteristics of noise correction intensity larger at the representative brightness 3 which is a bright part. As a result, it is possible to suppress a phenomenon that, for example, when noise correction is conducted at a dark part, noise that is left without disappearing is emphasized in a case where the signal level is corrected, resulting in an unnatural video on the contrary.

As shown in FIG. 8B, it is possible to determine corresponding noise correction intensity with respect to all local brightness values and frequency values calculated by the local information acquisition unit 0602 and it becomes possible for the noise correction unit 0603 to conduct noise correction, by calculating noise correction intensity with interpolation at frequency values other than the representative frequency values. In a case where the image signal correction unit 0604 improves both the brightness and definition feeling of edges with respect to the input image, therefore, it becomes possible to conduct noise correction conformed to respective correction characteristics.

By the way, in the above-described example, the noise correction intensity in the noise correction unit 0603 is determined in conjunction with the correction quantity of every brightness and every frequency in the image signal correction unit 0604. However, reduction of computation load may be attempted by determining the noise correction intensity in conjunction with either one of them.

According to the present embodiment, it becomes possible to generate an image having a higher picture quality and higher visibility by conducting noise correction paying attention not only to brightness but also to the frequency component according to characteristics of signal level correction in this way.

<<Third Embodiment>>

Figure 9:
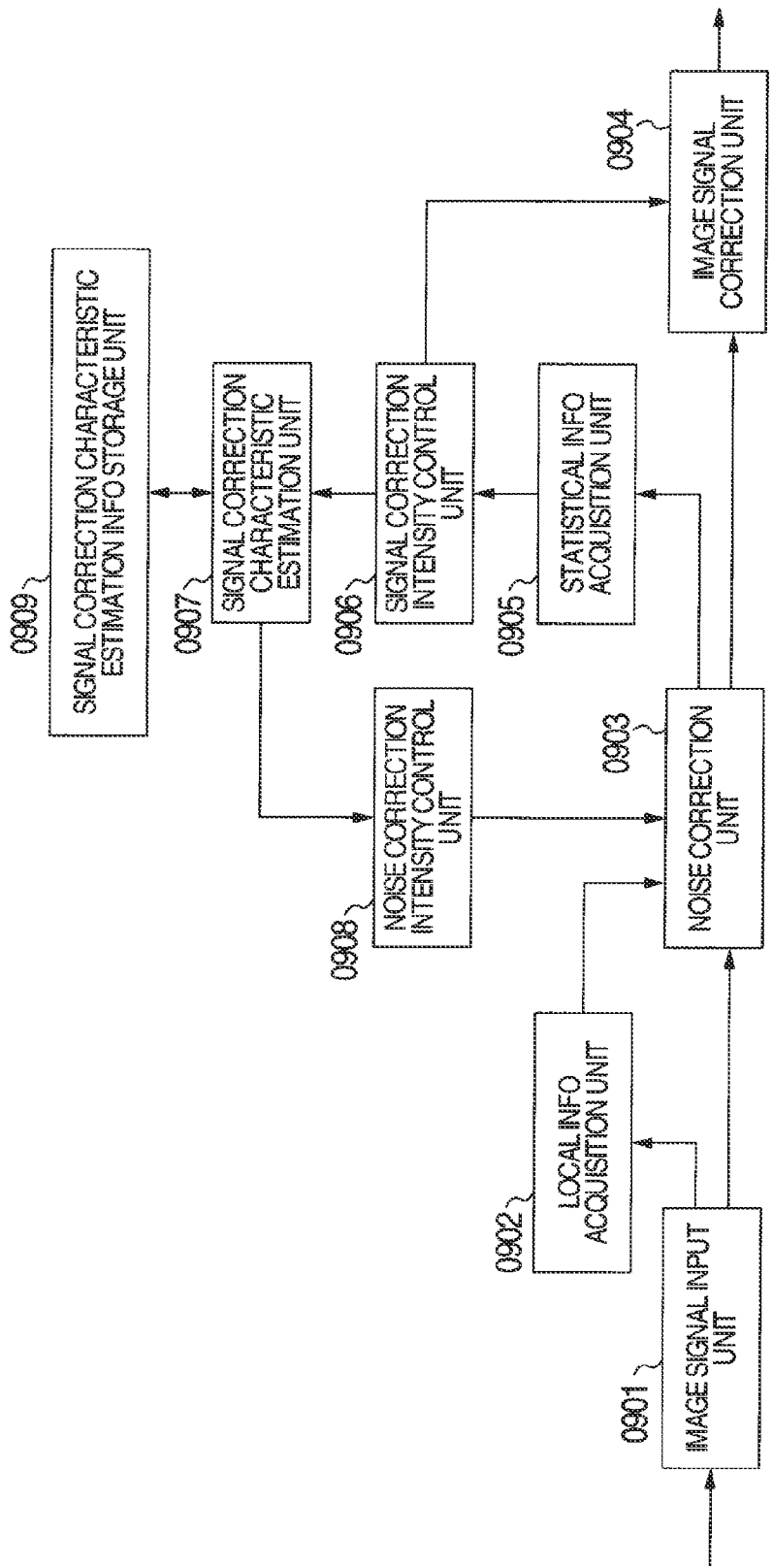
FIG. 9 is a schematic diagram showing an image signal processing apparatus according to a third embodiment of the present invention.

FIG. 9 is a schematic diagram showing an image signal processing apparatus according to a third embodiment of the present invention. In FIG. 9, reference numeral 0901 denotes an image signal input unit, 0902 a local information acquisition unit, 0903 a noise correction unit, 0904 an image signal correction unit, 0905 a statistical information acquisition unit, 0906 a signal correction intensity control unit, 0907 a signal correction characteristic estimation unit, 0908 a noise correction intensity control unit, and 0909 a signal correction characteristic estimation information storage unit. The image signal processing apparatus shown in FIG. 9 has a configuration obtained by adding the signal correction characteristic estimation information storage unit 0909 to the schematic diagram showing the image signal processing apparatus according to the first embodiment of the present invention shown in FIG. 1. By the way, processing units having the same names as those in other embodiments have functions similar to those already described unless otherwise stated.

In the image signal processing apparatus shown in FIG. 9, the signal correction characteristic estimation information storage unit 0909 corresponds to a ROM area on a program, a nonvolatile memory, a recording medium or the like. The signal correction characteristic estimation information storage unit 0909 stores signal correction characteristic estimation information to be used by the signal correction characteristic estimation unit 0907 to estimate signal correction characteristics when the image signal correction unit 0904 conducts signal level correction on the basis of the correction intensity in signal level correction determined by the signal correction intensity control unit 0906. As for the signal correction characteristic estimation information, in a case where input-output characteristics of the signal level correction in the image signal correction unit 0904 are already known, a signal correction quantity conformed to the input-output characteristics should be found previously and stored. If the input-output characteristics are not known, values estimated by previous calibration should be stored. Furthermore, in a case where the image signal correction unit 0904 conducts signal level correction with different correction characteristics every brightness and frequency in the input signal, a correction quantity conformed to the input-output characteristics at representative brightness and a representative frequency should be stored.

It becomes possible for the signal correction characteristic estimation unit 0907 to estimate signal correction characteristics conformed to the input-output characteristics of signal level correction in the image signal correction unit 0904 with high precision by using the correction intensity in signal level correction determined by the signal correction intensity control unit 0906 and the signal correction characteristic estimation information acquired from the signal correction characteristic estimation information storage unit 0909. As a result, it becomes possible to conduct optimum noise correction according to a correction effect of the signal level correction processing, and it becomes possible to generate an image signal having a high picture quality and high visibility.

Figure 10:
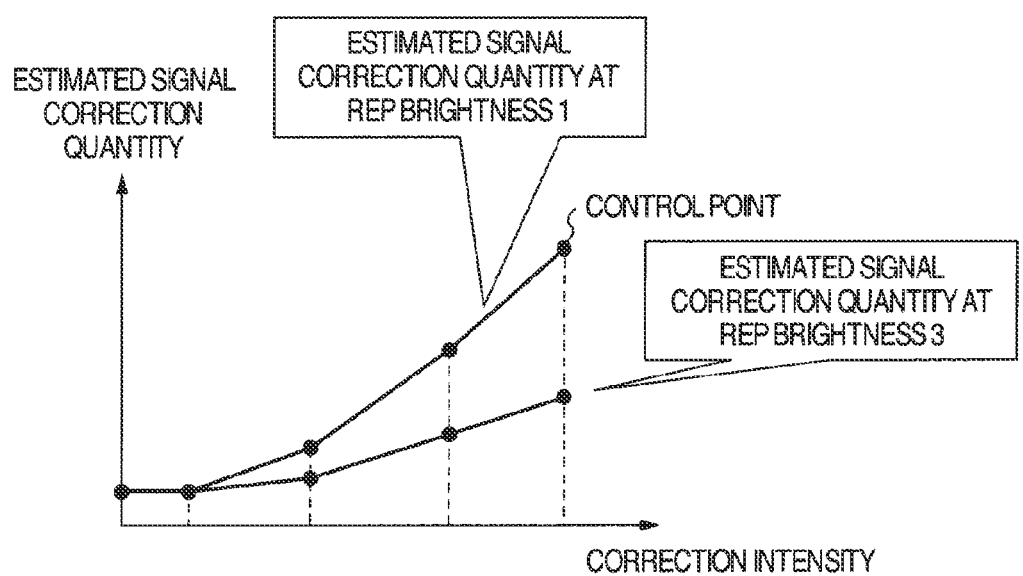
FIG. 10 is a diagram showing an example of a storage method of signal correction characteristic estimation information according to the third embodiment of the present invention.

FIG. 10 is a diagram showing an example of a storage method of the signal correction characteristic estimation information according to the third embodiment of the present invention. In the present embodiment, storage of the signal correction characteristic estimation information is executed by the signal correction characteristic estimation information storage unit 0909.

With respect to the correction intensity in signal level correction determined by the signal correction intensity control unit 0906, the signal correction characteristic estimation information storage unit 0909 stores signal correction quantity values corresponding to representative correction intensity values as control points and calculates an estimated value of the signal correction quantity corresponding to the actual correction intensity by using interpolation processing as shown in FIG. 10. At this time, the signal correction quantity differs depending upon representative brightness of the input signal as shown in FIG. 3B. By storing signal correction quantity values corresponding to representative correction intensity values as well every representative (rep) brightness as control points, therefore, it becomes possible to easily estimate the signal correction quantity in the image signal correction unit 0904 at each brightness.

In a case where the image signal correction unit 0904 conducts signal level correction with different correction characteristics every brightness and every frequency of the input signal, for example, a signal correction quantity corresponding to representative correction intensity is stored every representative brightness and every representative frequency. In other words, data should be retained as a three-dimensional table. As a result, it becomes possible to easily estimate correction characteristics of the signal level from correction parameters in the image signal correction processing by using only a simple calculation, and the computation cost of control software can be reduced remarkably.

According to the present embodiment, the correction intensity in noise correction can be calculated easily from control information of correction intensity in signal level correction by using estimation information of signal correction characteristics in this way. It becomes possible to execute optimum noise correction according to the effect of signal level correction at low cost.

<<Fourth Embodiment>>

Figure 11:
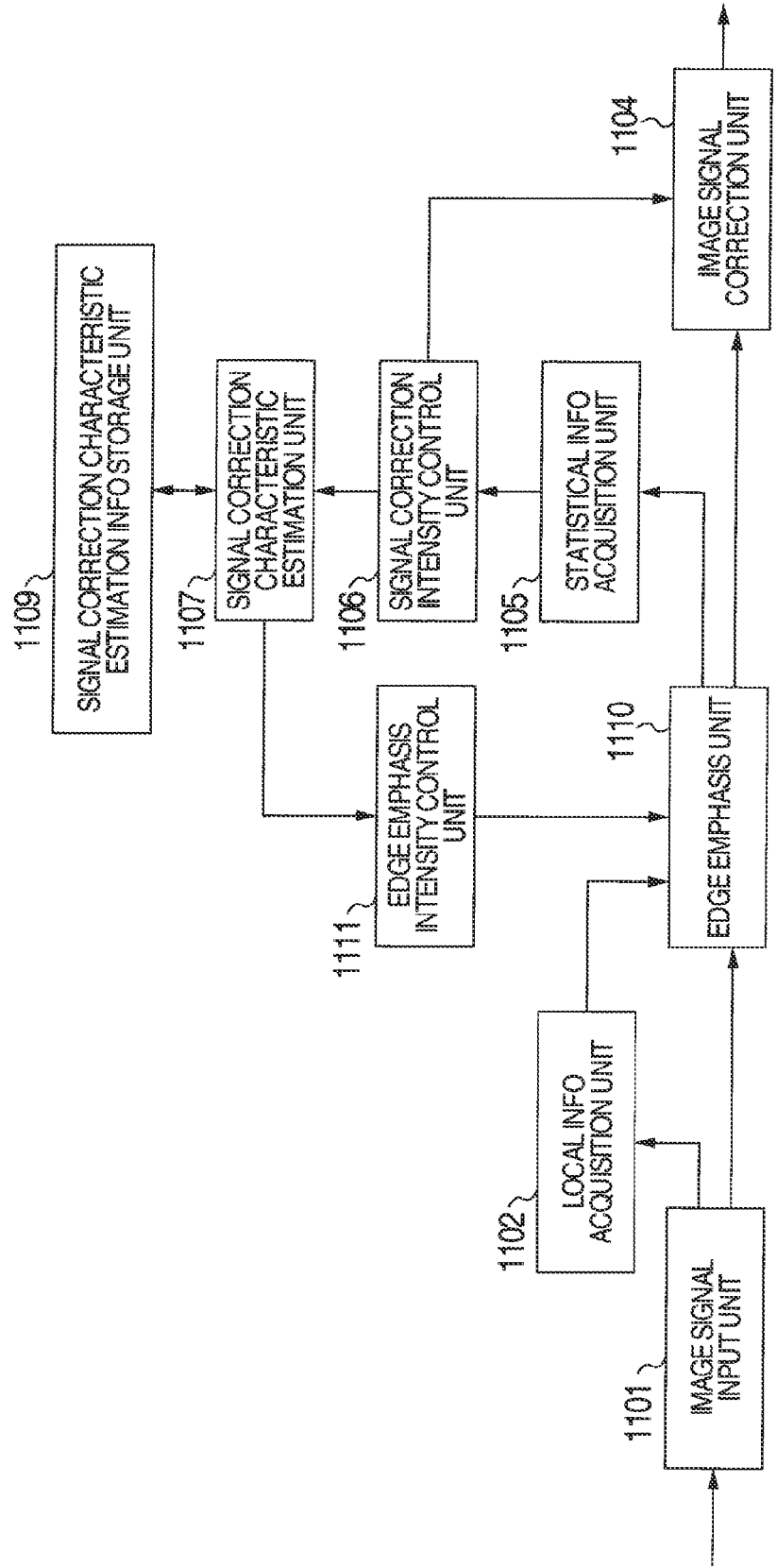
FIG. 11 is a schematic diagram showing an image signal processing apparatus according to a fourth embodiment of the present invention.

FIG. 11 is a schematic diagram showing an image signal processing apparatus according to a fourth embodiment of the present invention. In FIG. 11, reference numeral 1101 denotes an image signal input unit, 1102 a local information acquisition unit, 1110 an edge emphasis unit, 1104 an image signal correction unit, 1105 a statistical information acquisition unit, 1106 a signal correction intensity control unit, 1107 a signal correction characteristic estimation unit, 1111 an edge emphasis intensity control unit, and 1109 a signal correction characteristic estimation information storage unit.

As for a difference between the image signal processing apparatus shown in FIG. 11 and the image signal processing apparatus shown in FIG. 9, the image signal processing apparatus shown in FIG. 11 has a configuration obtained by replacing the noise correction unit 0903 and the noise correction intensity control unit 0908 with the edge emphasis unit 1110 and the edge emphasis intensity control unit 1111, respectively. By the way, processing units having the same names as those in other embodiments have functions similar to those already described unless otherwise stated.

In the image signal processing apparatus shown in FIG. 11, the edge emphasis unit 1110 conducts edge emphasis processing on local brightness values calculated by the local information acquisition unit 1102 for pixels included in the image signal which is output from the image signal input unit 1101, with different correction intensity values, and generates an image signal to be output. The edge emphasis processing can be implemented by, for example, extracting signal components in a predetermined frequency area from the input image signal with a high pass filter or a band pass filter, conducting gain processing, and adding a resultant signal to the input image signal. The edge emphasis intensity control unit 1111 determines emphasis intensity of every brightness in the edge emphasis processing conducted by the edge emphasis unit 1110, on the basis of signal correction characteristics estimated by the signal correction characteristic estimation unit 1107, and exercises control.

Figure 12A:
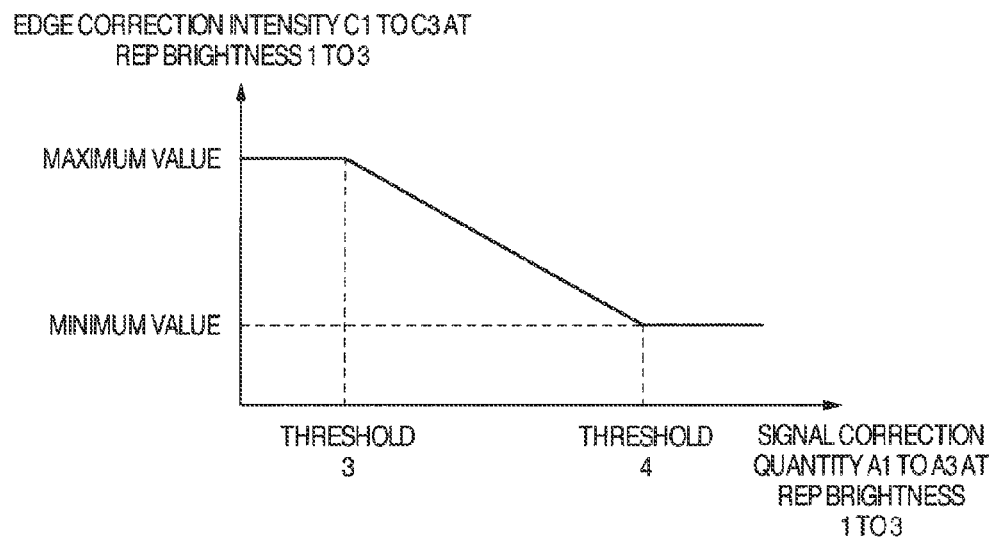
FIG. 12A is a diagram showing an example of a control method of edge emphasis intensity using a signal correction quantity in representative brightness according to the fourth embodiment of the present invention.
Figure 12B:
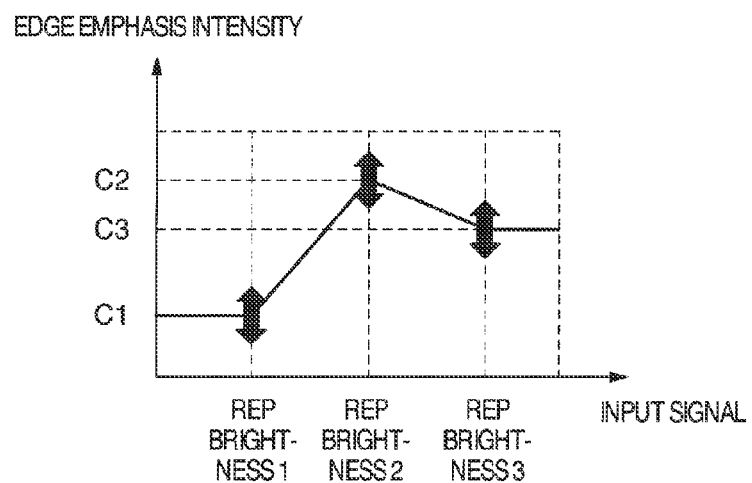
FIG. 12B is a diagram showing an example of a control method of edge emphasis intensity in each brightness according to the fourth embodiment of the present invention.

FIGS. 12A and 12B are diagrams showing an example of an emphasis intensity control method in edge emphasis according to the fourth embodiment of the present invention. In the present embodiment, emphasis intensity control processing in edge emphasis is executed by the edge emphasis intensity control unit 1111. FIG. 12A is a diagram showing an example of a control method of edge emphasis intensity using a signal correction quantity at representative brightness. FIG. 12B is a diagram showing an example of a control method of edge emphasis intensity at each brightness.

As shown in FIG. 12A, the edge emphasis intensity control unit 1111 controls correction intensity values C1 to C3 in edge emphasis processing of every brightness value in the edge emphasis unit 1110, on the basis of the signal correction quantity values A1 to A3. At this time, the correction intensity in edge emphasis processing is decreased as the signal correction quantity becomes large. In a case where the signal correction intensity control unit 1106 conducts signal level correction processing to expand the signal, therefore, lowering of picture quality caused by that the noise component is emphasized can be suppressed by weakening the edge emphasis effect according to the signal correction quantity.

In FIG. 12A, the signal correction quantity and the color noise correction intensity linearly between a threshold 3 and a threshold 4 in order to simplify the description. However, control may be exercised to cause a nonlinear change. It is possible to further provide a threshold between, and exercise control to interpolate with a plurality of line segments. Or it is possible to provide correction intensity values discretely and exercise control to cause a discontinuous change. Furthermore, the relation between the signal correction quantity values A1 to A3 and the edge emphasis intensity values C1 to C3 is represented by the same input-output characteristics. However, it is also possible to provide different thresholds or inclinations at representative brightness values 1 to 3, and make the edge emphasis intensity weaker in a dark part where noise is apt to be conspicuous and make the edge emphasis intensity stronger in a bright part where noise is not apt to be conspicuous.

As shown in FIG. 12B, it is possible to determine corresponding edge emphasis intensity with respect to all local brightness values calculated by the local information acquisition unit 1102 and it becomes possible for the edge emphasis unit 1110 to conduct edge emphasis, by calculating edge emphasis intensity with interpolation at brightness other than the representative brightness.

According to the present embodiment, it is possible to execute noise suppression conformed to characteristics of signal level correction by controlling correction intensity in edge emphasis processing instead of correction intensity in noise correction processing in this way. And it becomes possible to generate an image having a high picture quality and high visibility at low cost.

<<Fifth Embodiment>>

Figure 13:
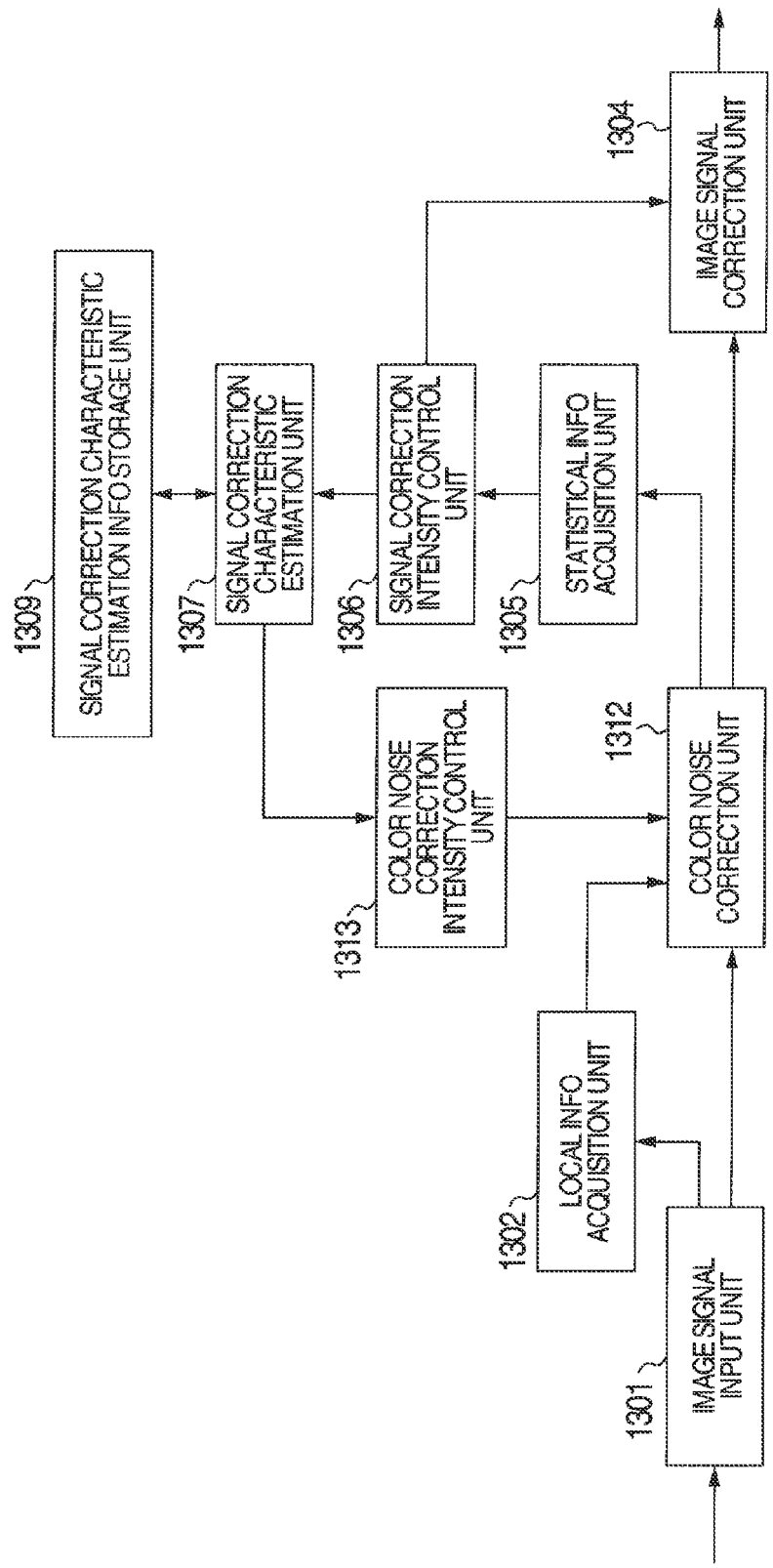
FIG. 13 is a schematic diagram showing an image signal processing apparatus according to a fifth embodiment of the present invention.

FIG. 13 is a schematic diagram showing an image signal processing apparatus according to a fifth embodiment of the present invention. In FIG. 13, reference numeral 1301 denotes an image signal input unit, 1302 a local information acquisition unit, 1312 a color noise correction unit, 1304 an image signal correction unit, 1305 a statistical information acquisition unit, 1306 a signal correction intensity control unit, 1307 a signal correction characteristic estimation unit, 1313 a color noise correction intensity control unit, and 1309 a signal correction characteristic estimation information storage unit. By the way, processing units having the same names as those in other embodiments have functions similar to those already described unless otherwise stated.

As for a difference between the image signal processing apparatus shown in FIG. 13 and the image signal processing apparatus shown in FIG. 9, the image signal processing apparatus shown in FIG. 13 has a configuration obtained by replacing the noise correction unit 0903 and the noise correction intensity control unit 0908 with the color noise correction unit 1312 and the color noise correction intensity control unit 1313, respectively.

In the image signal processing apparatus shown in FIG. 13, the color noise correction unit 1312 conducts color noise correction processing on local brightness values calculated by the local information acquisition unit 1302 for pixels included in a color signal in the image signal which is output from the image signal input unit 1301, with different correction intensity values, and generates an image signal to be output. The color noise correction processing can be implemented by, for example, conducting reduction of color variation from the peripheral color using a low pass filter on the color signal in the input image signal or reducing the saturation degree of the color signal to make the color itself light.

The color noise correction intensity control unit 1313 determines emphasis intensity of every brightness in the color noise correction processing conducted by the color noise correction unit 1312, on the basis of signal correction characteristics estimated by the signal correction characteristic estimation unit 1307, and exercises control.

Figure 14A:
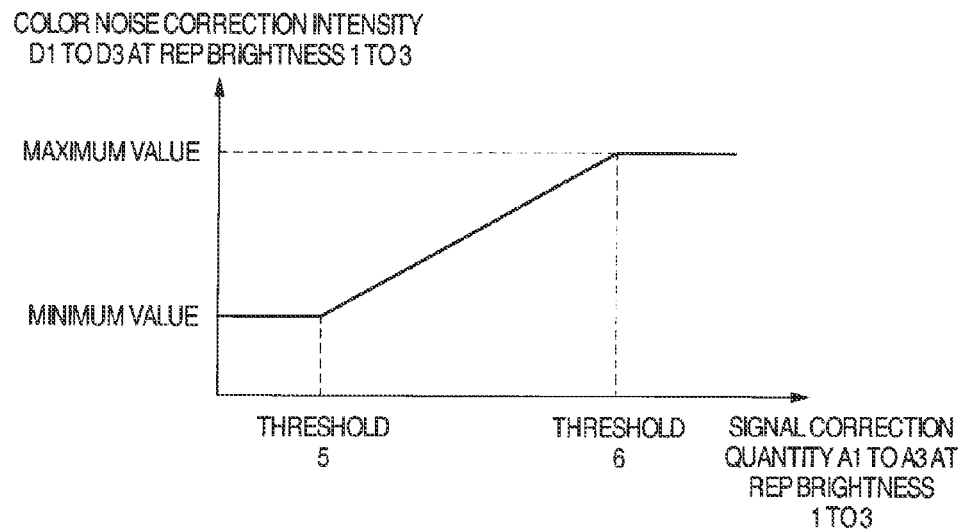
FIG. 14A is a diagram showing an example of a control method of color noise correction intensity using a signal correction quantity in representative brightness according to the fifth embodiment of the present invention.
Figure 14B:
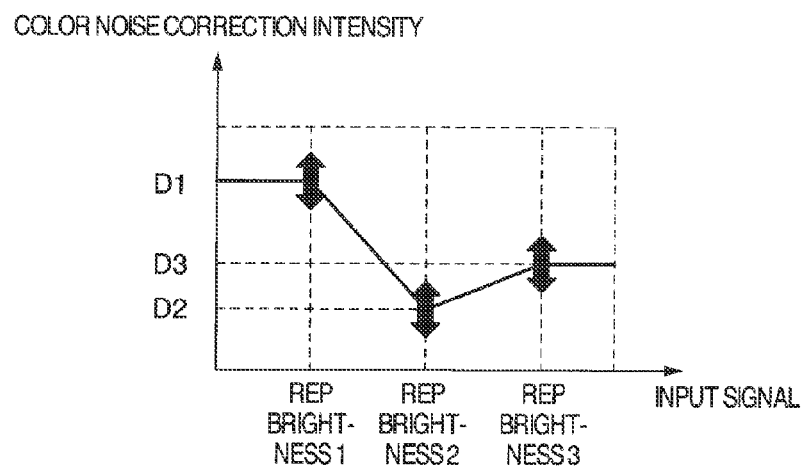
FIG. 14B is a diagram showing an example of a control method of color noise correction intensity in each brightness according to the fifth embodiment of the present invention.

FIGS. 14A and 14B are diagrams showing an example of a color noise correction intensity control method in color noise correction according to the fifth embodiment of the present invention. In the present embodiment, color noise correction intensity control processing in color noise correction is executed by the color noise correction intensity control unit 1313. FIG. 14A is a diagram showing an example of a control method of color noise correction intensity using a signal correction quantity at representative brightness. FIG. 14B is a diagram showing an example of a control method of color noise correction intensity at each brightness.

As shown in FIG. 14A, the color noise correction intensity control unit 1313 controls correction intensity values D1 to D3 in color noise correction processing of every brightness value in the color noise correction unit 1312. At this time, the correction intensity in color noise correction processing is increased as the signal correction quantity becomes large. In a case where the signal correction intensity control unit 1306 conducts signal level correction processing to expand the signal, therefore, lowering of picture quality caused by that the color noise component is emphasized can be suppressed by weakening the correction effect of color noise correction according to the signal correction quantity.

In FIG. 14A, the signal correction quantity and the color noise correction intensity linearly between a threshold 5 and a threshold 6 in order to simplify the description. However, control may be exercised to cause a nonlinear change. It is possible to further provide a threshold between, and exercise control to interpolate with a plurality of line segments. Or it is possible to provide correction intensity values discretely and exercise control to cause a discontinuous change. Furthermore, the relation between the signal correction quantity values A1 to A3 and the color noise correction intensity D1 to D3 is represented by the same input-output characteristics. However, it is also possible to provide different thresholds or inclinations at representative brightness values 1 to 3, and make the color noise correction intensity stronger in a dark part where color noise is apt to be conspicuous and make the color noise correction intensity weaker in a bright part where noise is not apt to be conspicuous. Conversely, in a case where processing of reducing the saturation degree of the color signal is conducted as the color noise correction processing, if the saturation degree of the color signal is reduced excessively, necessary information is hampered and there is a possibility that the visibility will not be improved even if the image signal correction unit 1304 corrects the signal level of the color signal. Conversely, therefore, control may be exercised to weaken the color noise correction intensity in the dark part.

As shown in FIG. 14B, it is possible to determine corresponding color noise correction intensity with respect to all local brightness values calculated by the local information acquisition unit 1302 and it becomes possible for the color noise correction unit 1312 to conduct color noise correction, by calculating color noise correction intensity with interpolation at brightness other than the representative brightness.

According to the present embodiment, it is possible to execute color noise suppression conformed to characteristics of signal level correction by controlling not only the correction intensity in noise correction processing for the luminance signal but also the correction intensity in color noise correction in conjunction with the brightness information in this way. And it becomes possible to generate an image having a high picture quality and high visibility at low cost.

<<Sixth Embodiment>>

Figure 15:
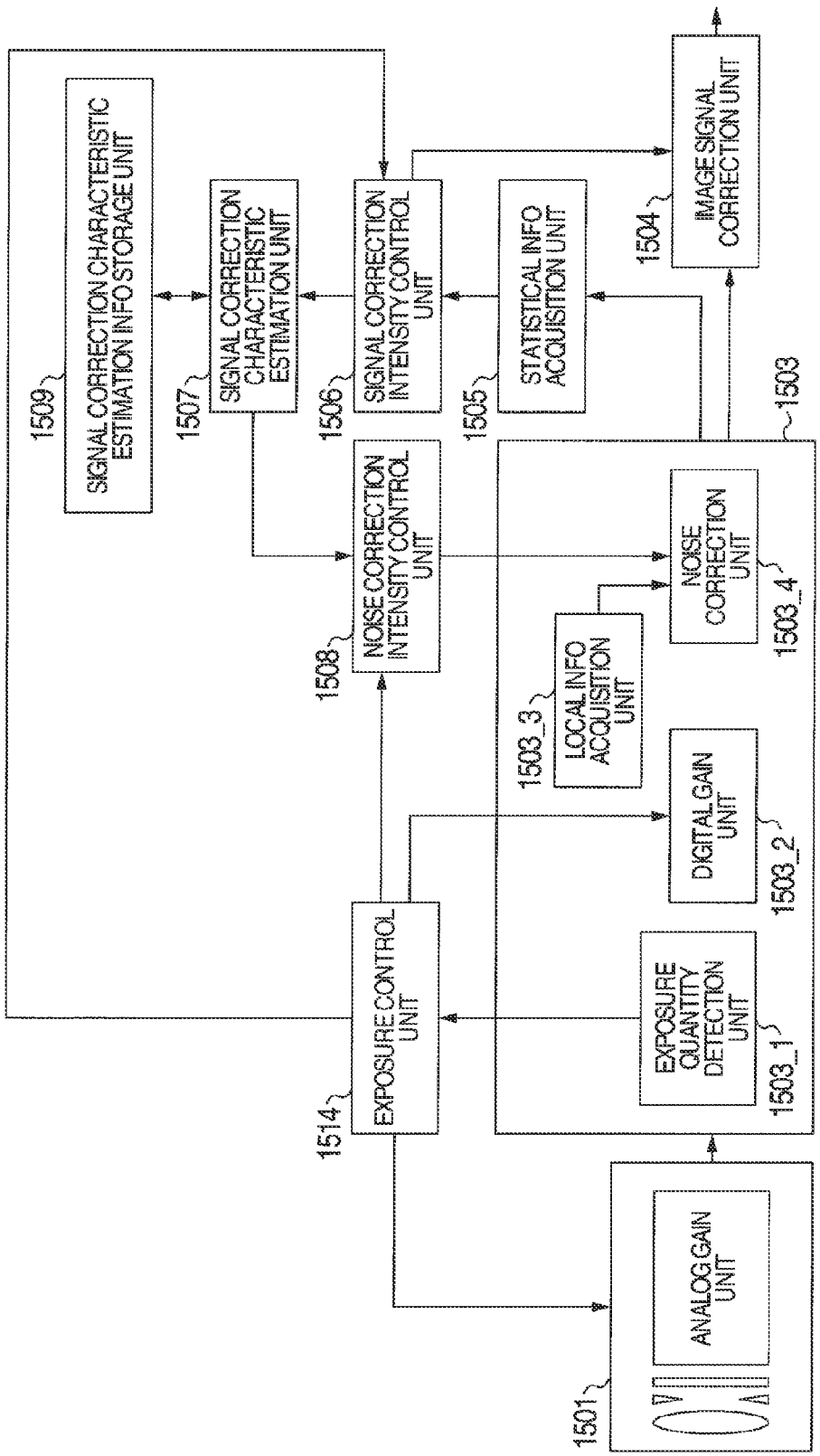
FIG. 15 is a schematic diagram showing an imaging apparatus according to a sixth embodiment of the present invention.

FIG. 15 is a schematic diagram showing an imaging apparatus according to a sixth embodiment of the present invention. In FIG. 15, reference numeral 1501 denotes an imaging unit, 1503 a camera signal processing unit, 1503_1 an exposure quantity detection unit, 1503_2 a digital gain unit, 1503_3 a local information acquisition unit, 1503_4 a noise correction unit, 1504 an image signal correction unit, 1505 a statistical information acquisition unit, 1506 a signal correction intensity control unit, 1507 a signal correction characteristic estimation unit, 1508 a noise correction intensity control unit, 1509 a signal correction characteristic estimation information storage unit, and 1514 an exposure control unit. By the way, processing units having the same names as those in other embodiments have functions similar to those already described unless otherwise stated.

In the imaging apparatus shown in FIG. 15, the imaging unit 1501 is configured by suitably using a lens group including a zoom lens and a focus lens, an iris, a shutter, an imaging element such as a CCD or a CMOS, a CDS, an AGC, an AD converter, and the like. The imaging unit 1501 conducts photoelectric conversion on an optical image received by the imaging element as light, and outputs a result as an image signal. The camera signal processing unit 1503 includes at least the exposure quantity detection unit, 1503_1, the digital gain unit 1503_2, the local information acquisition unit 1503_3, and the noise correction unit 1503_4. The camera signal processing unit 1503 conducts detection processing of exposure quantity evaluation value, digital gain processing, local brightness calculation processing for each pixel, and noise correction processing on the image signal which is output by the imaging unit 1501, and generates an image signal to be output.

Furthermore, it is also possible to conduct various kinds of digital signal processing such as processing of separation into the luminance signal and the color signal, edge emphasis processing, gamma processing, color difference conversion processing, white balance correction processing, and digital zooming to raise the picture quality or add functions. As for coefficients used when conducting each signal processing, such as, for example, the brightness correction quantity and gamma characteristics, values previously set and stored in a memory or the like may be used, or control values may be changed on the basis of various kinds of information such as luminance distribution detected from the image signal.

The image signal correction unit 1504 determines input-output characteristics of the image signal on the basis of correction intensity in signal level correction which is output by the signal correction intensity control unit 1506, corrects a signal level, which is a signal value of every pixel in the image signal output from the camera signal processing unit 1503, on the basis of the input-output characteristics, generates an output signal, and outputs the output signal to a video output unit, a video compression unit, and the like which are not illustrated.

The correction of the image signal executed by the image signal correction unit 1504 includes backlight correction, fog-haze correction, dynamic range widening processing, and the like conducted by correcting a signal level. The correction of the image signal can be implemented by, for example, previously holding correspondence of an output value to an input value as a coefficient of a function or a lookup table of correspondence, correcting the coefficient of the function or values in the lookup table on the basis of the correction intensity in signal level correction, determining input-output characteristics, and converting the signal level of the image signal on the basis of the input-output characteristics. Furthermore, it is also possible to previously hold a plurality of function coefficients or correspondence lookup tables for correction corresponding to a plurality of correction intensity values, and select a function coefficient or a correspondence lookup table to be used on the basis of correction intensity output by the signal correction intensity control unit 1506 at the time of processing or use them with interpolation, in order to reduce the computation cost.

Furthermore, it is also possible to use a configuration capable of conducting brightness correction even with the RGB signal or the like by calculating brightness information in processing similar to that in the local information acquisition unit 1503_3 instead of the luminance signal, correcting only the brightness information on the basis of input-output characteristics, finding an input-output ratio of the brightness information, and correcting pixel values of the original image signal on the basis of the input-output ratio of the brightness information. Furthermore, it is also possible to separate the input image signal into a plurality of components, conduct different correction processing on the components, and combine resultant components. For example, if the input image signal is separated into a low frequency component and a high frequency component in preprocessing and the low frequency component is regarded as brightness information, it is possible to correct brightness of the subject and definition feeling of edges respectively by conducting different signal level correction processing on each of the low frequency component and the high frequency component.

Furthermore, it may be made possible to conduct optimum correction from subject to subject in an image by conducting signal level correction processing with different input-output characteristics from area to area in the image signal. Furthermore, for the luminance signal and the color signal, processing of the same characteristics should be executed to make a ratio between the luminance signal and the color signal in the output nearly equal to that in the input. Or it is also possible to attempt to optimize the performance or the calculation cost by using a configuration that executes processing of different characteristics on the luminance signal and the color signal or that executes processing on only either one of the signals. The statistical information acquisition unit 1505 is supplied with the image signal that is output by the camera signal processing unit 1503, as an input. The statistical information acquisition unit 1505 measures statistical information of the signal value and outputs the statistical information.

Here, the statistical information is, for example, histogram distribution of a signal value of each pixel in the image signal or a statistical quantity such as an average value, a maximum value, a minimum value, or a standard deviation of the signal value. The statistical information is used to make the correction intensity proper when the signal correction intensity control unit 1506 discriminates a scene in the image signal and the image signal correction unit 1504 corrects the signal level. At this time, improvement of the scene discrimination performance may be attempted by acquiring statistical information of signal values of pixels in a predetermined area in the image signal, acquiring statistical information of signal values of pixels in an area where an subject detected by image recognition exists, or acquiring statistical information concerning only pixels having signal values in a predetermined range. For example, in a case where the image signal correction unit 1504 conducts signal level correction processing with different input-output characteristics from area to area in the image signal, optimum signal level correction processing can be implemented every area by acquiring statistical information with a unit conformed to the area.

The signal correction intensity control unit 1506 discriminates a scene in the image signal on the basis of the statistical information which is output by the statistical information acquisition unit 1505, and determines correction intensity at the time when the image signal correction unit 1504 corrects the signal level. In a case where the image signal correction unit 1504 conducts signal level correction processing with different input-output characteristics from area to area in the image signal, the signal correction intensity control unit 1506 may acquire measured statistical information with a unit conformed to the area and determine the correction intensity every area.

By the way, it is also possible to use a configuration in which the statistical information acquisition unit 1505 is included in the camera signal processing unit 1503 and the statistical information acquisition unit 1505 acquires statistical information from the image signal which is output from the imaging unit 1501 or an image signal in the middle of digital signal processing. In this case, statistical information used for control in various kinds of signal processing in the camera signal processing unit 1503 can be utilized for control in signal level correction processing in the image signal correction unit 1504 as well, resulting in cost reduction.

Furthermore, it is also possible to use a configuration in which the signal correction intensity control unit 1506 does not use statistical information which is output by the statistical information acquisition unit 1505, but determines a value input from an input unit which is not illustrated, as the correction intensity in signal level correction processing. In this case, control of the correction intensity cannot be exercised in conjunction with a scene in the image signal. However, the statistical information acquisition unit 1505 can be omitted and it is possible to attempt to reduce the calculation time in a case of implementation using software and reduce the development cost in a case of implementation using hardware.

Furthermore, it is also possible to use a configuration in which the signal correction intensity control unit 1506 further conducts correction based on exposure control information acquired from the exposure control unit 1514, on the determined correction intensity and outputs a computed final correction intensity as a control value. As a result, it becomes possible to control the correction intensity in the signal level correction processing conducted in the image signal correction unit 1504 in conjunction with both the exposure control state and the scene in the image signal.

A control method of correction intensity in the signal level correction processing using the exposure control information will be described later with reference to FIG. 17. The signal correction characteristic estimation unit 1507 estimates a signal correction characteristic which is an evaluation value indicating how much the signal was amplified every brightness by the signal level correction conducted by the image signal correction unit 1504 on the basis of the correction intensity determined by the signal correction intensity control unit 1506 and signal correction characteristic estimation information acquired from the signal correction characteristic estimation information storage unit 1509.

The signal correction characteristic estimation information storage unit 1509 corresponds to a ROM area on a program, a nonvolatile memory, a recording medium or the like. The signal correction characteristic estimation information storage unit 1509 stores signal correction characteristic estimation information to be used by the signal correction characteristic estimation unit 1507 to estimate the signal correction quantity of every brightness when the image signal correction unit 1504 conducts signal level correction on the basis of the correction intensity in signal level correction determined by the signal correction intensity control unit 1506. As for the signal correction characteristic estimation information, in a case where input-output characteristics of the signal level correction in the image signal correction unit 1504 are already known, a signal correction quantity conformed to the input-output characteristics should be found previously and stored. If the input-output characteristics are not known, values estimated by previous calibration should be stored. Furthermore, in a case where the image signal correction unit 1504 conducts signal level correction with different correction characteristics every brightness and frequency in the input signal, a correction quantity conformed to the input-output characteristics at representative brightness and a representative frequency should be stored.

The noise correction intensity control unit 1508 determines the correction intensity every brightness in noise correction processing conducted by the noise correction unit 1503_4 and exercises control on the basis of the signal correction characteristic estimated by the signal correction characteristic estimation unit 1507 and the exposure control information acquired from the exposure control unit 1514. The noise correction unit 1503_4 conducts noise correction on the basis of this correction intensity. As a result, it becomes possible to conduct noise correction according to the correction intensity in signal level correction processing conducted by the image signal correction unit 1504.

The exposure control unit 1514 acquires an evaluation value of light quantity from the exposure quantity detection unit 1503_1, and controls an iris diaphragm, shutter timing, an analog gain quantity of an AGC in the imaging unit 1501, a digital gain quantity in the digital gain unit 1503_2, and the like to make the actual exposure quantity approach a predetermined target exposure quantity. Furthermore, at the same time, the exposure control unit 1514 outputs the degree of the iris diaphragm, time of a period for which the shutter is open, an analog gain quantity, a digital gain quantity, or a signal amplification factor depending upon an analog gain or a digital gain, and the like as the exposure control information. As a result, it becomes possible for the noise correction intensity control unit 1508 to control the correction intensity in optimum noise correction in conjunction with both the signal amplification caused by exposure control and the signal correction quantity caused by signal level correction processing. And a high picture quality can be implemented.

It is possible to use a configuration in which the noise correction intensity control unit 1508 controls not only the correction intensity in the noise correction processing conducted by the camera signal processing unit 1503, but also effects of various kinds of signal processing such as the emphasis intensity in the edge emphasis processing and the gamma correction intensity in the gamma processing in the same way in conjunction with the exposure control information and the correction intensity in the signal level correction processing, and consequently the picture quality of the whole signal processing can be controlled optimally in conjunction with both the exposure control and the signal level correction processing. By the way, for example, the camera signal processing, the signal level correction processing, and the statistical information acquisition processing are executed in a DSP, a dedicated LSI, or the like, and the correction intensity control processing in the signal level correction, the signal correction characteristic estimation processing, the correction intensity control processing in the noise correction, and the exposure control processing are executed in a microcomputer or the like. In the case where all of various kinds of signal processing, the noise correction control, and picture quality correction control are conducted in the imaging apparatus as in the present embodiment, the influence of the quantization error is slight and the signal range can be utilized to the full and consequently there is a merit that a high picture quality can be implemented and the influence of the video delay is also slight.

By the way, the statistical information acquisition unit 1505 calculates statistical information from the image signal after the noise correction which is output from the image signal correction unit 1504, and the noise correction intensity control unit 1508 controls the correction intensity with which the noise correction unit 1503_4 conducts noise correction.

Therefore, the timing order in control becomes reverse. When conducting still picture processing, therefore, the above-described processing can be implemented by conducting loop processing which includes executing the noise correction with an initial value of the correction intensity, controlling the correction intensity in the signal level correction processing by using statistical information obtained from an image after the noise correction, determining correction intensity in noise correction anew from an estimation result of the image signal correction quantity at that time, and a series of processing is repeated again.

On the other hand, when the present configuration conducts moving picture processing in which a continuous imaging signal is input and a series of processing is conducted every frame, an imaging object does not change largely between frames. Therefore, estimation processing of a signal correction characteristic and noise correction intensity control processing in a current frame can be conducted by using statistical information calculated by the statistical information acquisition unit 1505 in the last frame. Noise correction processing and image signal correction processing adapted to the scene in real time can be conducted. In a case where the imaging object has changed largely between frames, there is a possibility that reliability of the statistical information in the last frame might have been hampered. Therefore, it is possible to prevent excessive correction from being executed by returning the correction intensity in the noise correction processing to the initial value without referring to the statistical information in the last frame.

In the scheme based on the present embodiment, not the output result of the actual image signal correction processing, but the estimated value of the correction quantity based upon the correction parameter is used to control the correction intensity in the noise correction processing. Therefore, the image signal correction processing need only be conducted once in one frame period on a latter part of the noise correction processing. In a case where moving picture processing is conducted in a video camera, therefore, noise correction processing can be conducted in conjunction with the correction characteristic in the image signal correction processing by only conducting the noise correction processing once and the image signal correction processing once during one frame period. As a result, the circuit scale at the time of implementation using hardware and the computation cost at the time of implementation using software can be reduced. In particular, even if processing of a complicated input-output characteristic is conducted as the image signal correction processing and the circuit scale increases, the present configuration needs only addition of control processing using software. As a result, remarkable increase of the cost can be prevented.

Furthermore, there is also a merit that the statistical information acquisition unit 1505 can conduct scene discrimination with high precision by calculating statistical information hardly influenced by noise from the image signal after the noise correction which is output from the camera signal processing unit 1503, and the visibility improvement using the image signal correction processing can be conducted with high precision.

Figure 16:
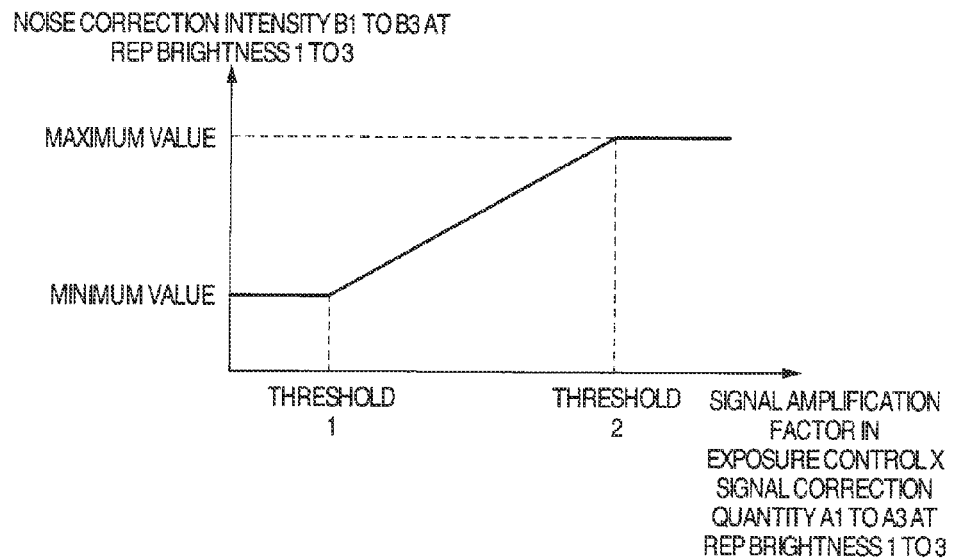
FIG. 16 is a diagram showing an example of a correction intensity control method in noise correction according to the sixth embodiment of the present invention.

FIG. 16 is a diagram showing an example of a correction intensity control method in noise correction according to the sixth embodiment of the present invention. In the present embodiment, correction intensity control processing in noise correction is executed in the noise correction intensity control unit 1508.

As shown in FIG. 16, as the exposure control information, a product of the signal amplification factor brought by the digital gain and the analog gain and the signal correction quantity in the signal level correction processing should be used to control the correction intensity in the noise correction processing as an overall correction quantity. In a case where the imaging scene is not sufficiently bright and the exposure control unit 1514 exercises control to increase the gain quantity, therefore, lowering of picture quality caused by that the noise component is also amplified simultaneously can be suppressed by intensifying the noise correction effect according to the gain quantity. At this time, it becomes possible to conduct noise correction in conjunction with the exposure control in a case where the correction intensity in the signal level correction processing is small and conduct noise correction in conjunction with both the exposure control and the signal level correction processing in a case where the correction intensity in the signal level correction processing is large.

Figure 17:
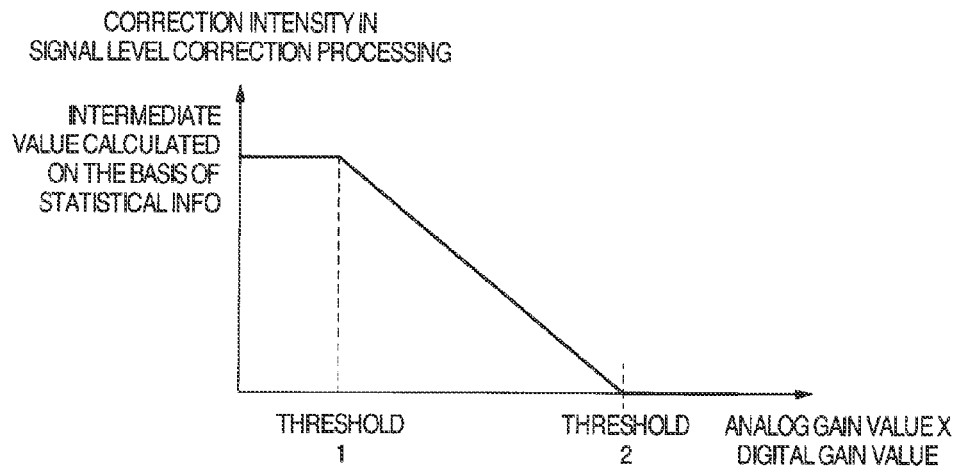
FIG. 17 is a diagram showing an example of a correction intensity control method in signal level correction processing according to the sixth embodiment of the present invention.

FIG. 17 is a diagram showing an example of a correction intensity control method in signal level correction processing according to the sixth embodiment of the present invention. In the present embodiment, the correction intensity control processing in the signal level correction processing is executed by the signal correction intensity control unit 1506.

As shown in FIG. 17, the signal correction intensity control unit 1506 conducts correction depending upon the exposure control information on an intermediate value of the correction intensity in the signal level correction processing determined on the basis of the statistical information which is output by the statistical information acquisition unit 1505, and determines and outputs final correction intensity. For example, in a case where the analog gain quantity or the digital gain quantity obtained by the exposure control is small, the signal correction intensity control unit 1506 exercises control to use a control value determined on the basis of the statistical information as it is. As the analog gain quantity or the digital gain quantity becomes large, the signal correction intensity control unit 1506 exercises control to use a value corrected to become small with the control value determined on the basis of the statistical information taken as reference. In a case where the analog gain quantity or the digital gain quantity is large and noise correction processing cannot be conducted sufficiently on an image with noise emphasized very much, therefore, it is possible to prevent the signal level correction processing and resultant intensive emphasis of noise from lowering the visibility.

Furthermore, since the signal correction characteristics estimated by the signal correction characteristic estimation unit 1507 are calculated in conjunction with the correction intensity in the signal level correction processing, the correction intensity in the noise correction controlled by the noise correction intensity control unit 1508 is also determined in conjunction with the correction intensity in the signal level correction processing. In a case where the analog gain quantity or the digital gain quantity is large, therefore, the correction intensity in the signal level correction processing is small and consequently the correction intensity in the noise correction is controlled mainly depending upon the analog gain quantity or the digital gain quantity. In the case where the analog gain quantity or the digital gain quantity is large, therefore, an effect similar to that in the case where the signal level correction processing does not exist is obtained, and a picture quality equivalent to that at the time when the function using the signal level correction processing is turned off is obtained.

By the way, in this example, the method of weakening the correction intensity in the signal level correction processing as the analog gain quantity or the digital gain quantity becomes large has been stated. However, control of weakening the correction intensity in the signal level correction processing and the noise correction intensity on the basis of the statistical information may also be exercised. For example, in a case where average luminance in the image signal is less than a predetermined threshold and high luminance does not exist, the correction intensity in the signal level correction processing is weakened. In a case where an input video is very dark, therefore, it is possible to prevent noise from being emphasized intensively by the signal level correction processing.

According to the present embodiment, the correction intensity in the noise correction is determined from the control information of the correction intensity in the signal level correction and the exposure control information in this way. As a result, it becomes possible to execute optimum noise correction depending upon the exposure state and the effect of the signal level correction, and it becomes possible to pick up an image having a high picture quality and high visibility at low cost.

<<Seventh Embodiment>>

Figure 18:
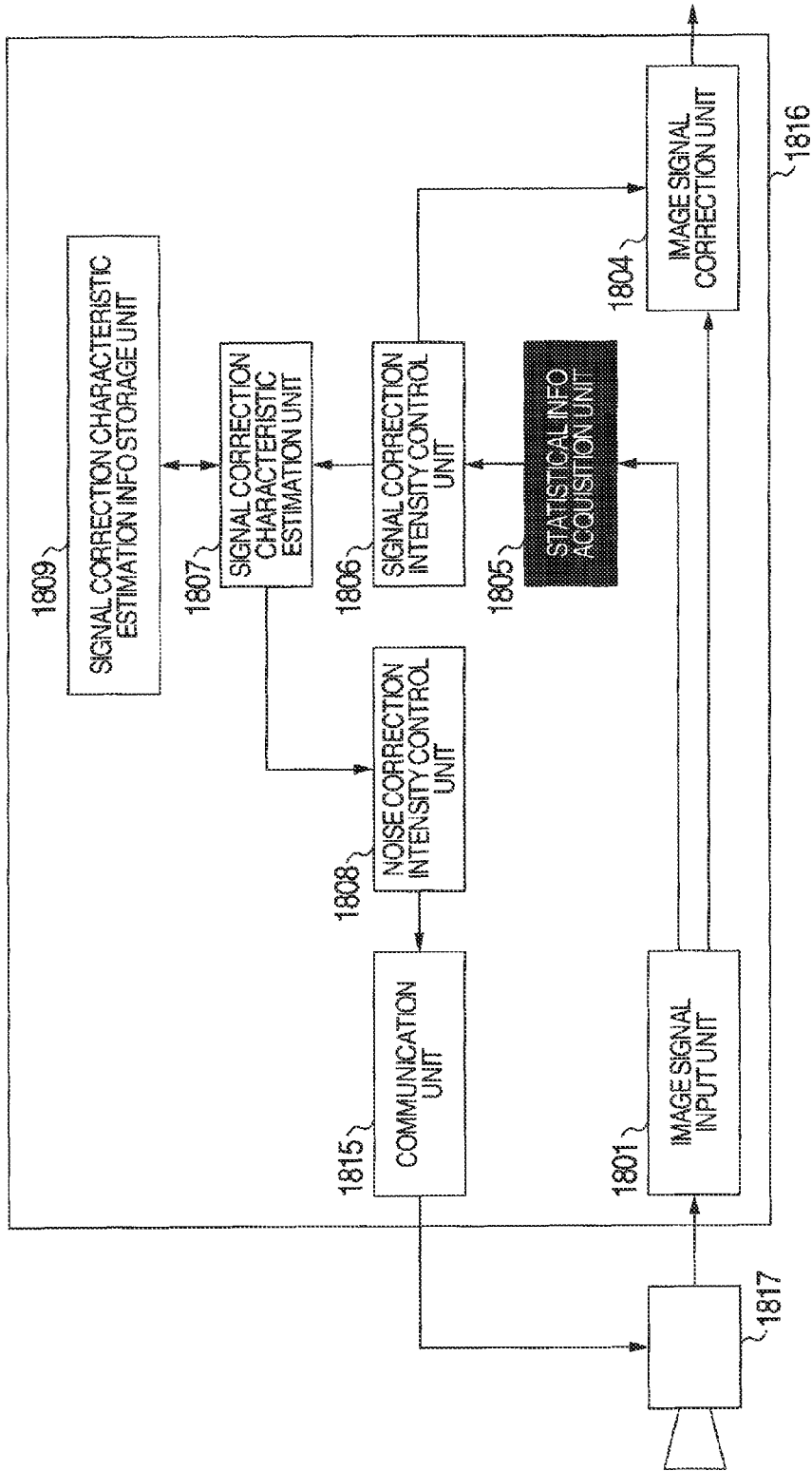
FIG. 18 is a schematic diagram showing an image signal processing apparatus and an imaging apparatus according to a seventh embodiment of the present invention.

FIG. 18 is a schematic diagram showing an image signal processing apparatus and an imaging apparatus according to a seventh embodiment of the present invention. In FIG. 18, reference numeral 1801 denotes an image signal input unit, 1804 an image signal correction unit, 1805 a statistical information acquisition unit, 1806 a signal correction intensity control unit, 1807 a signal correction characteristic estimation unit, 1808 a noise correction intensity control unit, 1809 a signal correction characteristic estimation information storage unit, 1815 a communication unit, 1816 an image signal processing apparatus having an image processing program that implements the image signal input unit 1801 to the signal correction characteristic estimation information storage unit 1809, and 1817 an imaging apparatus having a noise correction adjustment function depending upon local brightness information. By the way, processing units having the same names as those in other embodiments have functions similar to those already described unless otherwise stated.

As for a difference between the image signal processing apparatus shown in FIG. 18 and the image signal processing apparatus shown in FIG. 9, the noise correction processing is conducted not in the image signal processing apparatus 1816, but in the imaging apparatus 1817 having the noise correction adjustment function depending upon local brightness information, and it is possible to transmit the correction intensity in the noise correction processing as an adjustment value from the image signal processing apparatus 1816 to the imaging apparatus 1817 having the noise correction adjustment function depending upon local brightness information via the communication unit 1815.

In the image signal processing apparatus and the imaging apparatus shown in FIG. 18, the image signal input unit 1801 is connected to the imaging apparatus 1817 having the noise correction adjustment function depending upon the local brightness information via a capture board, a LAN, a USB or the like connected to a video cable. And the image signal input unit 1801 acquires an image signal picked up by the imaging apparatus 1817 having the noise correction adjustment function depending upon the local brightness information.

The image signal correction unit 1804 determines input-output characteristics of the input signal on the basis of the correction intensity in the signal level correction which is output by the signal correction intensity control unit 1806, corrects a signal level which is a signal value of every pixel of an image signal output by the image signal input unit 1801, on the basis of the input-output characteristics, and generates an output signal.

The statistical information acquisition unit 1805 is supplied with the image signal, which is output by the image signal input unit 1801, as an input. The statistical information acquisition unit 1805 measures and outputs statistical information of the signal value. The noise correction intensity control unit 1808 determines a noise correction adjustment value for the imaging apparatus 1817 having the noise correction adjustment function depending upon local brightness information, on the basis of a signal correction quantity of every brightness estimated by the signal correction characteristic estimation unit 1807, and outputs the noise correction adjustment value to the communication unit 1815.

The communication unit 1815 transmits the noise correction adjustment value to the imaging apparatus 1817 having the noise correction adjustment function depending upon local brightness information by communication conducted via a serial port, a parallel port, or a LAN, or the like. Even if the imaging apparatus which conducts camera signal processing including noise correction processing is an apparatus different from the image signal processing apparatus which conducts the signal level correction processing, therefore, it becomes possible to execute optimum noise correction depending upon the correction intensity in the signal level correction processing and pick up an image having a high picture quality and high visibility at low cost.

By the way, the present invention is not restricted to the above-described embodiments, but various modifications are included. For example, the embodiments have been described in detail to describe the present invention intelligibly. The present invention is not necessarily restricted to embodiments having all described configurations. Furthermore, it is possible to replace a part of a configuration in a certain embodiment by a configuration in another embodiment. Furthermore, it is also possible to add a configuration in another embodiment to a configuration in a certain embodiment.

By the way, the present invention can be applied to an imaging apparatus, a PC application, an image processing apparatus, or the like in public welfare, monitoring, vehicle-mounted, and business use.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image signal processing apparatus comprising:
an image signal input unit supplied with an image signal as an input;
at least one processor executing stored instructions to:
calculate a statistical quantity of pixel values in a local area including a noted pixel from an image signal input from the image signal input unit, as local information;
determine a noise correction intensity;
conduct noise correction processing on an image signal input from the image signal input unit on the basis of the noise correction intensity by using the local information;
determine a signal level correction intensity of the image signal which has been noise-correction-processed; and
estimate a characteristic of a signal level correction on the basis of the signal level correction intensity; and
conduct signal level correction processing on the image signal which has been noise-correction-processed on the basis of the signal level correction intensity;
wherein
controlling the noise correction intensity is determined depending upon the local information in the noise correction processing, in conjunction with the estimated characteristics of the signal level correction.

2. The image signal processing apparatus according to claim 1, wherein the local information is a brightness component of a noted pixel in the image signal input from the image signal input unit.

3. The image signal processing apparatus according to claim 1, wherein the local information is a signal component every frequency in a local area including a noted pixel in the image signal input from the image signal input unit.

4. The image signal processing apparatus according to claim 1, wherein the at least one processor further executes stored instructions to expand a signal in each of a dark part and a bright part in accordance with brightness of a noted pixel in the processed image signal, and conduct signal level correction processing with correction characteristics in which an expansion quantity in the dark part becomes larger than an expansion quantity in the bright part.

5. The image signal processing apparatus according to claim 4, wherein the at least one processor further executes stored instructions to:
estimate characteristics of level correction in the signal level correction processing in each of a dark part and a bright part, and
exercise control to make correction intensity in a dark part in the noise correction processing more intense than correction intensity in a bright part in conjunction with estimated characteristics of level correction in the dark part and the bright part.

6. The image signal processing apparatus according to claim 5, wherein the at least one processor further executes stored instructions to cause the correction intensity in the noise correction processing to further differ also depending upon a signal component of every frequency in a local area including a noted pixel.

7. The image signal processing apparatus according to claim 1, wherein the characteristics of the level correction are a ratio between an input value and a correction quantity value at each of a plurality of representative signal levels in the input-output characteristics of the signal level correction processing on the basis of a predetermined signal level correction intensity.

8. The image signal processing apparatus according to claim 1, wherein the characteristics of the level correction are a ratio between a difference in input value and a difference in output value in each of a plurality of intervals each between two levels and respectively including a plurality of representative signal levels in the input-output characteristics of the signal level correction processing on the basis of a predetermined signal level correction intensity.

9. The image signal processing apparatus according to claim 8, wherein the plurality of intervals each between two signal levels differ depending upon the plurality of representative signal levels, respectively.

10. The image signal processing apparatus according to claim 1, wherein the at least one processor further executes stored instructions to:
calculate distribution or a statistical quantity of a signal value in a whole or a predetermined area of an image signal which has been noise-correction-processed as an input as statistical information and output the statistical information,
control the signal level correction intensity in the signal level correction processing on the basis of the statistical information.

11. The image signal processing apparatus according to claim 1, wherein the at least one processor further executes stored instructions to:
store, as signal correction characteristic estimation information, information to be used to estimate signal level correction characteristics in the signal level correction processing corresponding to the correction intensity in the determined signal level correction processing
acquire the signal correction characteristic estimation information and estimate characteristics of signal level correction on the basis of the signal correction characteristic estimation information and the determined signal level correction intensity.

12. The image signal processing apparatus according to claim 1, wherein the at least one processor further executes stored instructions to:
conduct edge emphasis processing on the image signal which is input from the image signal input unit by using the local information, and output the image signal, the edge of which has been emphasized, and
compute and weaken correction intensity in the edge emphasis processing every brightness in conjunction with the characteristics of the estimated signal level correction so as to suppress noise.

13. The image signal processing apparatus according to claim 1, wherein
the image signal which is input from the image signal input unit comprises a luminance signal and a color signal,
wherein the at least one processor further executes stored instructions to:
calculate brightness of a noted pixel from the luminance signal in the image signal which is input from the image signal input unit, as local information, and conduct color noise correction processing on the color signal with correction intensity which differs depending upon the brightness of the noted pixel, and
compute correction intensity in the color noise correction processing every brightness in conjunction with the estimated characteristics of the level correction, and exercise control.

14. An imaging apparatus comprising:
an imaging unit for conducting imaging and generating and outputting an image signal;
at least one processor executing stored instructions to:
detect an exposure quantity of the imaging unit;
control exposure of the imaging unit on the basis of the detected exposure quantity;
calculate a statistical quantity of pixel values in a local area including a noted pixel from the image signal output by the imaging unit, as local information;
determine a noise correction intensity;
conduct noise correction processing on the image signal output by the imaging unit on the basis of the noise correction intensity by using the local information;
determine a signal level correction intensity of the image signal which has been noise-correction-processed;
estimate a characteristic of a signal level correction on the basis of the signal level correction intensity; and
conduct signal level correction processing on the image signal which has been noise-correction processed on the basis of the signal level correction intensity, wherein
the noise correction intensity is determined depending upon the local information in the noise correction processing, in conjunction with the estimated characteristics of the signal level correction and a degree of the exposure control.

15. The imaging apparatus according to claim 14, wherein the at least one processor further executes stored instructions to correct the signal level correction intensity in conjunction with the degree of the exposure control.

16. The imaging apparatus according to claim 15, wherein the at least one processor further executes stored instructions to make the signal level correction intensity smaller as exposure control which increases a signal gain is exercised.

17. An image processing method comprising:
- connecting to an imaging apparatus and supplying the imaging apparatus with an image signal as an input, the imaging apparatus having a noise correction adjustment function of calculating a statistical quantity of pixel values in a local area including a noted pixel, as local information and conducting noise correction processing by using the local information;
- determining a signal level correction intensity of the image input by the image signal input step;
- estimating characteristics of the signal level correction on the basis of the signal level correction intensity;
- performing a signal level correction processing on the image signal which has been noise-correction-processed on the basis of the signal level correction intensity;
- determining a noise correction intensity according to the local information of the noise correction processing in the imaging apparatus, in conjunction with the characteristics of the signal level correction estimated by the signal correction characteristic estimation step; and
- transmitting the noise correction intensity determined by the noise correction intensity control step to the imaging apparatus.

* * * * *